US012659187B2

(12) United States Patent
Apers et al.

(10) Patent No.: US 12,659,187 B2
(45) Date of Patent: Jun. 16, 2026

(54) EXTENSION ELEMENT FOR A DEVICE IN A BUS NETWORK

(71) Applicant: CONSTELL8, Hemiksem (BE)

(72) Inventors: Roel Apers, Hemiksem (BE); Wouter Moors, Bocholt (BE); Roel Velkeneers, Antwerp (BE)

(73) Assignee: CONSTELL8, Hemiksem (BE)

( * ) Notice: Subject to any disclaimer, the term of this patent is extended or adjusted under 35 U.S.C. 154(b) by 343 days.

(21) Appl. No.: 18/032,886

(22) PCT Filed: Oct. 22, 2021

(86) PCT No.: PCT/EP2021/079390
§ 371 (c)(1),
(2) Date: Apr. 20, 2023

(87) PCT Pub. No.: WO2022/084526
PCT Pub. Date: Apr. 28, 2022

(65) Prior Publication Data
US 2023/0327909 A1     Oct. 12, 2023

(30) Foreign Application Priority Data
Oct. 22, 2020    (BE) .................................. 2020/5744

(51) Int. Cl.
*H04L 12/40* (2006.01)
*H04L 41/12* (2022.01)
(52) U.S. Cl.
CPC ........ *H04L 12/40032* (2013.01); *H04L 41/12* (2013.01)
(58) Field of Classification Search
CPC ............. H04L 12/403; H04L 12/40032; H04L 12/423; G08B 29/06; G08B 25/04
See application file for complete search history.

(56) References Cited

U.S. PATENT DOCUMENTS

2011/0266867 A1* 11/2011 Schindler ................ G06F 1/266
307/24
2016/0275783 A1* 9/2016 Lewonig ............... H04L 12/403

FOREIGN PATENT DOCUMENTS

CN          102545178 B     10/2014

OTHER PUBLICATIONS

Belgian Search Report from corresponding BE Patent Application No. BE 202005744, Jun. 14, 2021.
International Search Report from corresponding PCT Application No. PCT/EP2021/079390, Dec. 21, 2021.

* cited by examiner

*Primary Examiner* — Mahran Y Abu Roumi
(74) *Attorney, Agent, or Firm* — Workman Nydegger

(57)          ABSTRACT

An extension element for a device suitable for being connected in a linear network with bus topology, includes: a first and a second connection point; a switch connected to the first and second connection point, so that in the closed state of the switch, a direct connection is present between the first and second connection point; in the open state of the switch, the direct connection is broken; a read-write connection between the read port of a first interface and the write port of a second interface, a processing unit configured to modify the state of the switch, and to change the impedance in said read-write connection or in a connection between the first and second interface via the processing unit, in order to change the status of the extension element from an idle status to a forward status.

15 Claims, 16 Drawing Sheets

EXTENSION ELEMENT FOR A DEVICE IN A BUS NETWORK

TECHNICAL FIELD

The present invention generally relates to the control of devices in an entertainment or other installation. In particular, the invention provides a retrofit solution for a system using conventional RS-485/DMX512 technology, allowing more efficient configuration and increased reliability.

BACKGROUND OF THE INVENTION

In entertainment applications such as festivals, concerts, and theatrical performances, professional installations are employed to control devices. These devices are, for example, spotlights, loudspeakers, a smoke machine, or motors for driving the movement of décor elements. Here, the way in which the devices are to behave is set via a central control element, for example a light or sound console, and these control data are sent to the various devices via a network of communication cables. These installations are often rather extensive, with hundreds of connected devices.

Typically, the devices are connected to one another in a network, in which the output port of one device is connected via a communication cable to the input port of a following device to form a chain. One end of this chain is then connected to the light or sound console where control takes place. Each device has its own controller which drives the device on the basis of received control data, i.e. it provides, for example, light of a given colour, sound of a given volume, a given mechanical movement, etc.

In a conventional arrangement of such installations, the RS-485 standard and the DMX512 protocol are used for the network communication. RS-485 is a standard that defines characteristics in relation to the physical layer of the network. RS-485 uses differential signalling, in which information is sent as a first voltage signal over a first conductor and a second, inverted, voltage signal over a second conductor. Since only the voltage difference between both conductors is detected by the receiver, the technology is less sensitive to electromagnetic noise. The RS-485 standard further makes it possible to implement a network with linear bus topology. With such a bus topology, the network has a common line or "bus" along which data are communicated, and each device is connected via an interface to this common line. All data are thus communicated via the common bus and are received by each device in the network. Lastly, the RS-485 standard only allows half-duplex communication, which means that sending and receiving take place over the same signal lines but never at the same time.

In a professional entertainment installation with the RS-485 standard, communication cables with 3-pin or 5-pin XLR connectors are used to connect the output of one device to the input of another device, which is referred to as "daisy chaining". Given that the in- and output are directly connected within each device, the aforementioned bus topology is created: the common "bus" is formed by the communication cables between the devices on the one hand, and the in-out connections within the devices on the other hand. The advantage of such a bus topology is that when one of the devices suffers a power failure, the devices connected further along in the chain continue to receive their signal correctly.

In a conventional arrangement of a professional entertainment installation, the RS-485 standard is used in combination with the DMX512 (digital multiplexed) protocol.

512 channels are considered in this protocol, which are shared over the devices in the network. Each device is thus assigned a number of channels, and each channel is used to control a given function on the device. The number of channels used per device may vary from device to device. On configuration, each device is assigned a start address; all of the devices receive the same data via the common bus, but the controller of each device listens only to the channels from the set start address. Because of the common bus, each device in the chain receives its control data at the same time, thereby allowing for a synchronous control of all devices.

The conventional solution with the RS-485 standard and DMX512 protocol above described has been known for more than 30 years, but it is still very frequently used in the professional AV market. This conventional solution is also commonly used in other applications outside the entertainment sector, for example for controlling lights that indicate in a car park whether a parking space is already occupied.

However, the use of such a conventional solution comes with a number of drawbacks. A first drawback relates to the configuration of the communication network. Configuration implies that it is established which function of which device will be controlled with which channels. For this, the respective position of the devices has to be mapped, and a start address has to be allocated to each device in the network so that it knows to which channels it should listen. Configuration has to take place again for each new event or performance in which another arrangement is used.

Broadly speaking, there are two possible configuration methods. In a first method, the start address is set on each individual device, for example using a row of switches, or DIP switch, on the device. A calculation is often needed to determine the correct position of the switches, which leads to a complex and error-prone set-up. Furthermore, a diagram is manually drawn up in which track is kept of which device is located where in the network, and which channels are meant for each device. Given the extent of a professional installation, such a configuration method is complex, time-consuming and error-prone.

A second configuration option uses what is referred to as the RDM protocol. Such a protocol allows two-way communication via a request-response system. With this, a list of the devices present in the network can be made via the computer of the central control element, in which list each device is identified by a unique ESTA code. On configuration, a request is sent by the central control element, for example: "are there devices present with a code between 0 and 100". If multiple devices want to respond thereto, the response is incomprehensible, given the common bus over which all communication takes place. Consequently, the request has to be refined, for example to: "are there devices present with a code between 0 and 50". If only one device responds, then this device is identified. Such interrogation has to be continued iteratively until a list is obtained with the codes of all of the connected devices. Given that it is necessary to wait for a response again each time and that many iterations may be needed, this configuration method also takes a lot of time to complete. Additionally, a list of devices can be established automatically in this way, but not the order of the connected devices in the network. It is thus still necessary to manually map where in the chain each device is located.

Besides the complex and time-consuming configuration, another drawback of the conventional solution relates to reliability, and more specifically on the occurrence of a defect in a communication cable. In the event of an interruption in a cable, there are already existing systems that can solve such problems: a special function then allows a number of the devices of the network to be reached via another route. For this, it is sufficient to construct the network as a ring. However, in the event of a short circuit in a cable, then-because of the bus topology-all of the data traffic over the common bus comes to a halt. As a result, none of the devices can be controlled anymore. Additionally, it is not possible to automatically trace in which cable the defect is located, which again entails much time lost through manual interventions.

In addition to the conventional RS-485/DMX512 solution as described, more recent, Ethernet-based solutions are already known. Here, the devices are, for example, connected in series, with a switch in each device which determines whether the data packet is intended for the device itself or should be transmitted to the device downstream. Such solution has the drawback that in the event of a power failure in the device, the data traffic to the downstream devices stops. Additionally, many users still currently possess the conventional RS-485/DMX512 solution, and switching to another type of solution would mean an expensive purchase.

Finally, solutions are known in the prior art using a ring topology and successive forwarding of data from one node to the next node in the ring. Such solutions do not make use of a common bus, wherein data is received by all nodes at the same time, but of a serial type of communication, wherein data is forwarded from one node to the other. An example of such a solution is found in US2016/0275783A1. A drawback of such a solution is that in case of a power failure in two nodes, the intermediate nodes cannot be reached anymore. Moreover, the solution in US2016/0275783A1 relates to controlling components of a fire alarm, firefighting or oxygen-reducing systems, e.g. components like gas sensors or extinguishing systems. For such applications, different requirements apply then for control of an entertainment installation. In particular, allowing for a synchronous control of all devices in the entertainment installation, e.g. changing the colour of multiple lights at exactly the same time, is of utmost importance. There is therefore a need for a solution in which the conventional RS-485/DMX512 technology can still be employed, but, via a retrofit, the drawbacks regarding configuration and reliability can be remedied.

It is an object of the present invention to describe a solution that overcomes one or more of the drawbacks of solutions of the prior art described above. More specifically, it is an object of the present invention to describe a retrofit solution for a system using conventional RS-485/DMX512 technology, allowing more efficient configuration and increased reliability.

SUMMARY OF THE INVENTION

According to a first aspect of the present invention, the objects identified above are achieved by an extension element for a device, wherein the device is suitable for being connected via a first and second communication cable to other devices in a linear network with bus topology, and wherein the extension element comprises:

a first and a second connection point suitable for connecting the extension element to the first respectively second communication cable;

a third connection point suitable for connecting the extension element to a control unit comprised in the device;

a switch connected to the first and second connection point;

a processing unit connected to the third connection point, and to the first and second connection point over a connection which does not comprise the switch;

a first and a second interface adapted for data exchange between the first respectively second connection point and the processing unit;

a read-write connection between the read port of the first interface and the write port of the second interface, and a write-read connection between the write port of the first interface and the read port of the second interface, wherein the processing unit is configured to:

modify the state of the switch such that in the closed state of the switch, a direct connection is present between the first and second connection point, the direct connection not comprising the first and second interface, and, in the installed state, forming part of the common bus of the network;

in the open state of the switch, the direct connection is broken;

change the impedance in the read-write connection or in the write-read connection or in a connection between the first and second interface via the processing unit, in order to change the status of the extension element from an idle status, wherein no data traffic is possible over the read-write and write-read connection, to a forward status, wherein data traffic is possible over the read-write or write-read connection.

In other words, the invention relates to an extension element for a device, wherein the device is suitable for being connected via a first and second communication cable to other devices in a linear network with bus topology. A device is an apparatus that is designed to perform a certain action. For example, a device is a light, a spotlight, or a "fixture", designed to generate light, or a loudspeaker, designed to generate sound. A device may also be an AV (audio/video) device. Yet other examples of a device are: a projector, a camera, a screen, a pulley, a moving décor element, an apparatus for generating special effects such as fire or fog, etc. Typically, such a device forms part of a complete installation with a large number of devices, for example a professional entertainment installation. The device comprises an electrical of mechanical component, for example the actual light or loudspeaker, and a control unit. A control unit is a controller or regulator, suitable for controlling various functions on the device on the basis of received control data, for example turning the light on or off, setting the desired light intensity or colour, the desired sound volume, making a décor element move in a certain way, etc.

The device is suitable for being connected via a first and second communication cable to other devices in a linear network. A linear network is a network in which consecutive devices are connected to one another, each time with a connection between two consecutive devices. The network may comprise a serial chain of devices or may form a ring. For example, the device has an input port and an output port, and a communication cable is connected into the output port of one device and into the input port of the subsequent device. A communication cable is a cable that allows transport of data for controlling the devices. For example, it is a cable with a 3-pin of 5-pin XLR connector.

The device is suitable for being connected with other devices in a network with bus topology. A bus topology refers to the presence of a common line or "bus" along which data are communicated, and to which each device connects via an interface. Data are thus communicated via the common bus, and are synchronously received by each device in the network. For example, the network uses the RS-485 standard which relates to the physical layer over which the communication takes place. In this case, the data are transported using differential signalling, in which information is sent as a first voltage signal over a first conductor and a second, inverted, voltage signal over a second conductor, and only the voltage difference between both wires is detected by the receiver. Typically, the network uses a bidirectional bus, so that it is suitable for half-duplex communication. This means that sending and receiving take place over the same signal lines but never at the same time.

The devices connected in the network receive their control data from a central control element. A central control element is, for example, a light console, sound console or computer which is connected to one side of the serial chain of devices. In this case, the output of the central control element is connected via a communication cable to the input port of the first device. It is also possible for an additional component to be present between the central control element and the first device, for example an Ethernet-DMX converter. Additionally, it is possible for the network to be connected in a ring, in which the central control element is connected to the first device in the chain and to the last device in the chain.

The extension element is a physical component, for example embodied as a printed circuit board (PCB). For example, the device has an housing or casing, and the extension element is arranged within the housing or casing of an existing device. In this way, the extension element forms an add-on or physical extension to a device that has already been purchased by a user. The installation of the extension element allows a retrofit of the existing device to be carried out. In another embodiment, the extension element is embodied as a separate apparatus, with its own housing, and this apparatus can be connected to the device so that they can both work together. In this case too, the extension element allows a retrofit of an existing system to be carried out. In yet another embodiment, the extension element is a component of a new device. i.e. a device that was not previously in use. This means that the extension element, together with other components, is assembled into a new device. In other words, the extension element forms part of the new device, and this complete unit is sold to the user. For example, the device comprises a PCB, on which elements are arranged corresponding to the design of the extension element. In this case, the extension element, present in the device to be sold new, allows more extensive possibilities with respect to a conventional device.

The extension element comprises a first and a second connection point suitable for connecting the extension element to the first respectively second communication cable. Such a connection point can be physically designed in various ways. For example, the extension element is embodied as a printed circuit board (PCB), on which connectors are provided as the first and second connection point. When installing the extension element in the device, a connection is then made between such a connector and the input/output port of the device. In this case, a communication cable is connected into the input and output port of the device. In another embodiment, the extension element is embodied as a separate apparatus, comprising two connectors into each of which a communication cable can be connected. Regardless of how the first and second connection point are actually designed, they allow, once connected in the network, data exchange to be established between the extension element and the network. For this, the connection points are tailored to the standard used in the network for communication. For example, the network uses the RS-485 standard and the data exchange via the first and second connection point thus takes place with half-duplex communication.

The extension element further comprises a third connection point suitable for connecting the extension element to the control unit of the device. Typically, there is already a control unit, namely a controller or regulator, present in an existing device. An extension element that is arranged in such a device can then be connected to the control unit via the third connection point. In another embodiment, a new device is assembled, with the installation of a control unit, the extension element and a connection between them both.

The extension element comprises a switch connected to the first and second connection point. A switch is an element by means of which, in the open state, the electric current can be interrupted. For example, it is a relay, in which a mechanical switch is operated by an electromagnet. In the closed state of the switch, a direct connection is present between the first and second connection point. For example, on installation of the extension element in the device, the connection already present between in- and output port is broken, and a new direct connection is formed over the switch of the extension element.

The extension element further comprises a processing unit. A processing unit is, for example, a microprocessor, chip or CPU. The processing unit can be programmed according to a certain type of logic, so that received data is interpreted and a given output is generated on the basis thereof.

The processing unit is connected to the third connection point. Via this route, the processing unit can thus communicate with the control unit, for example transmit settings to the control unit or request data from the device. Optionally, an interface is present between the processing unit and the third connection point. In one embodiment, the control unit is designed for the RS-485 standard, while the processing unit is designed for another standard, for example an asynchronous serial bus (UART) or other board-level serial busses as I2C and SPI. In an embodiment, the RS-232 standard may be used at the level of the processing unit. An interface then allows communication between both elements. In another embodiment, the processing unit and the control unit use one and the same standard, and no interface is present at the location of the third connection point.

The processing unit is also connected to the first and second connection point, each time over a connection which does not comprise the switch Thus, the processing unit is located in a first branch of the common bus, that first branch being in a position to one side of the switch. Data received via the first connection point can thus be transmitted to the processing unit, without passing via the switch. There is also a connection present between the second connection point and the processing unit, in which this connection does not comprise the switch. Thus, there are two branches of the common bus, in positions to both sides of the switch. Data sent out by the processing unit can thus reach the second connection point without passing via the switch. A first interface is present in the first branch, to one side of the switch, and a second interface is present in the second branch, to the other side of the switch. The interface allows the standard of the bus, for example RS-485, to be converted to a standard of the processing unit, for example an asynchronous serial bus (UART) or other board-level serial busses as I2C and SPI. In the closed state of the switch, the data traffic takes place over the common bus. The processing unit branches off from this bus, and thus receives all of the data that are sent on the bus. Data intended for the device can be transmitted to the control unit. In the open state of the switch, no data traffic is possible over the common bus. However, communication remains possible between the processing unit and a directly connected neighbouring device or directly connected central control element, via the first and/or second connection point of the extension element. For example, status data or configuration messages may be exchanged via this route.

The extension element further comprises:

a read-write connection between the read port of the first interface and the write port of the second interface, a write-read connection between the write port of the first interface and the read port of the second interface.

This means that the extension element comprises a first interface, with a read and write port, and comprises a second interface, with a read and write port. The first and second interface are each located in a branch on either side of the switch and are each connected to the processing unit. Between the read port of the first interface and the write port of the second interface, a connection is present, referred to as the read-write connection. Analogously, between the write port of the first interface and the read port of the second interface, a connection is present, referred to as the write-read connection.

The processing unit is configured to modify the state of the switch. For example, the switch is a relay, and the powering of the electromagnet in the relay can be adjusted via the processing unit. The processing unit also comprises a certain type of logic, by means of which the processing unit determines when the state of the switch should be modified. The change of the state of the switch can, for example, take place on request of the central control element. In another embodiment, the processing unit can change the state of the switch on its own initiative, for example on the basis of a received measurement. In the closed state of the switch, a direct connection is present between the first and second connection point, which, in the installed state, forms part of the common bus of the network. This means that when the extension element is connected in the network, the common bus of the network is formed by the communication cables on the one hand, and the direct connection between the first and second connection point in each extension element on the other hand. In the closed state of all of the switches, the central control element thus communicates with the network via this common bus. Data sent thereto are received synchronously by all of the devices. The system then operates in bus mode, i.e. in a manner analogous to a conventional solution with the RS-485 standard and DMX512 protocol. However, in the open state of the switch, the direct connection between first and second connection point is broken. At that moment, the common bus of the network is interrupted, and no data traffic is possible over this bus any more.

The processing unit is further configured to change the status of the extension element from an idle status to a forward status, and vice versa. In the idle status, no data traffic is possible over both the read-write and write-read connection. In the forward status data traffic is possible, either over the read-write connection or over the write-read connection. Changing the status is done by the processing unit, wherein the processing unit initiates a change in an impedance. This may relate to an impedance in the read-write connection, or an impedance in the write-read connection, or an impedance in a connection between the first interface and the processing unit, or an impedance in a connection between the second interface and the processing unit. This means that, on the basis of an output generated by the processing unit, relative impedances are changed, in order to force the data to flow according to a preferred path, namely the path of the lowest impedance.

Various embodiments are possible to implement the status change. In a first embodiment, a component with an adjustable resistance, e.g. a variable resistor or transistor, is placed in the read-write and write-read connection, thereby allowing to change the impedance of the respective read-write/write-read connection. In a second embodiment, the status change is triggered by changing an impedance at the level of the first and second interface, without having an additional adjustable component between both interfaces. For example, an adjustable impedance in the read-write/write-read connections may be obtained by adjusting the impedance of specific pins present in the interfaces. For example, pins of an RS-485 driver may be put in a high or low impedance state or may be connected or disconnected to change the impedance. In a third embodiment, an impedance in a connection between the first interface and the processing unit, or an impedance in a connection between the second interface and the processing unit, is changed. For example, a pin of the microprocessor may be put in a low or high impedance state.

The extension element according to the invention, allows the devices in the network to be controlled either in bus mode or in serial mode, which brings advantages in terms of synchronisation, reliability and configuration efficiency. This will now be explained in detail below.

First, the extension element allows the network to be controlled in bus mode. Indeed, when the switches of all extension elements included in the network are closed, control data may be transmitted over the common bus of the network, just like is the case in the conventional RS-485/DMX512 solution. As a result, control data is received by all devices at the same time, thereby allowing synchronous control of all devices. For instance, the colour of multiple lights in the network can be changed at exactly the same time. Moreover, by virtue of the presence of the switch, controllable via the processing unit, there is the possibility to interrupt the common bus of the network at a specific position. It is thus possible, by virtue of the extension element, to interrupt the bus at carefully chosen locations, and thus to segment the chain as desired. This affords various possibilities, resulting in advantages with respect to the conventional RS-485/DMX512 solution.

First, while operating in bus mode, there is the possibility to open the switch in one of the extension elements of the network. In this way, the common bus of the network is interrupted in one place. Data traffic is still possible over the bus, up to the location of the interruption; the bus can be shortened, as it were. From this stems the possibility, on configuration, to carry out a sequence in which the bus first only reaches the first device, followed by the first and second device, etc. In this way it is possible to identify the first device in the first step, followed by the second device, etc. As a result, not only can a list of connected devices be established, but also the order in which the devices are connected in the network. The mapping of which device has which position in the chain thus no longer has to take place manually. Once the devices have been identified and their order has been determined, each device can further be individually addressed by the central control element in order to assign a start address. The entire configuration can proceed automatically in this way. This contributes to a more efficient and less error-prone configuration of the system.

A second possibility that exists by virtue of the use of the extension element is that of completely disconnecting the bus temporarily, by opening the switch on each of the extension elements. As a result, the processing unit of an extension element is uncoupled from the bus, as it were. There is still the possibility for one-to-one communication to be carried out between the device and a directly connected neighbouring device or between the device and a directly connected central control element. Communication then proceeds over the first and/or second connection point of the extension element. Such one-to-one communication, in which a device only communicates with its neighbour, is not possible in the case of pure bus topology. From this stems the possibility, on configuration, to carry out a sequence in which each device determines its neighbour. From these data, the central control element can again deduce the order of the connected devices. This thus provides an alternative method for determining the order automatically. Again, this contributes to a more efficient and less error-prone configuration.

A third possibility that arises from the use of the extension element, while operating in bus mode, is that two switches can be opened in a targeted manner so as to isolate a section of cable from the bus. In normal operation, the data traffic proceeds over the bus, in which all of the switches are closed. However, should a short occur in a cable, then the two switches of the processing units to the left and right of the defect are opened. In this way, data traffic over the bus is possible again, with the exception of the isolated cable with the defect. All of the devices can then be reached again via the bus, albeit partially via the other portion of the ring. Additionally, it is possible to detect via the processing unit of the extension elements when the defect arises, for example via a voltage measurement on the interface with the first or second connection point. In this way, the short is automatically detected, and the data traffic is also automatically restored via the opening of the selected switches. This increases the reliability of the system and reduces the need for manual interventions to find defects.

In summary, the invention allows to control the network in bus mode, while the switch affords the possibility of interrupting the bus. Moreover, intelligence is introduced into the device via the processing unit, which allows the switch to be controlled and the desired data to be exchanged with, for example, a neighbouring device or the control unit. This can be employed in the system in various applications of use, which allows a more efficient configuration and increased reliability to be achieved. Moreover, the closing of all of the switches allows normal operation to be maintained like in the conventional system, with data traffic over the common bus leading to synchronous control, and no disruption in the event of a power failure in a device.

Furthermore, the extension element allows the network to be controlled in serial mode. Said serial operation is obtained by leaving the switch of each extension element open while controlling the devices, thereby thus disconnecting the bus. When transmitting control data to the devices, the extension elements are in forward status. Data traffic thus takes place over the direct read-write or write-read connection of each extension element, depending on the transmission direction. Instead of using the bus topology, a serial topology is thus employed in that case, in which consecutive interfaces each transmit data to one another. The serial mode or serial topology may also be referred to as a cascade topology, or a peer-to-peer type of communication. Such a topology has the advantage, compared to the bus topology, that in the event of a short in a cable, not all of the data traffic comes to a halt, and devices can still be reached by redirecting the data traffic. A drawback of such a topology is that in the event of power failure in two devices, the intermediate devices cannot be reached anymore. Therefore, in the occasional event that a power failure occurs in a device, the switches can temporarily be closed again.

Moreover, while being operated in serial mode, the extension elements still allow for a synchronous control of the devices connected in the network. Indeed, as control data is only being sent after the extension elements are put into forward status, control data is transmitted merely over a passive connection. Such passive connection is purely a direct connection, or only comprises passive components. Therefore, data is not transmitted over active components, having certain logic or intelligence, which components could introduce a certain delay. The transmission over a passive connection allows for a very fast transmission of the control data over all devices, without any delay introduced by the various nodes. As a result, while working in serial mode, a synchronous control of all devices, wherein all devices receive the control data quasi at the same time, is still possible.

Additionally, in serial mode, the switch of each of the extension elements can stay open for the entire configuration phase. Indeed, the neighbour determination, required to determine the order of the devices, can now take place by temporarily opening the read-write and writ-read connections, thus putting the extension element in idle status. The opening and closing of those connections by adjusting an impedance allows much faster operation than when neighbour determination needs to be done via the opening and closing of the switches. In the latter method, a certain waiting period, required for stabilization, has to be applied each time after closing the switch. Otherwise, noise occurring on the line immediately after closing the switch could wrongfully be interpreted as a data signal. Conversely, when changing the status of an extension element by means of adjusting an impedance, such a waiting period is not necessary. Furthermore, the extension element can be put in idle status again whenever the end of transmission of control data is detected by an extension element. In this way, a device can receive messages, e.g. for requesting a status according to the RDM protocol, from the central control element at any time when no control data is being exchanged. In this, the use of adjustable impedances allows for flexibly changing the state from closed to open and vice versa, without requiring any waiting period for stabilisation.

Finally, the invention allows a user to continue to work with the conventional devices and cables that they already have, and the above advantages can be achieved via a straightforward retrofit. The retrofit merely requires an inexpensive purchase of a suitable number of extension elements, and straightforward installation in or on the device.

Optionally, the extension element is suitable for being installed in a housing of the device, and the first respectively second connection point are suitable for connecting, in the installed state, to an input port respectively output port comprised in the housing of the device. For example, the device is a device that was already previously in use, in a conventional RS-485/DM512 set-up. The device is provided with a housing or casing, within which a control unit and the technology for producing light, producing sound, etc. is located. The device is also provided with an input and output port, suitable for communication cables to be connected thereto. To retrofit such a device, the housing has to be opened, and the extension element then has to be installed. The extension element then forms an add-on to the existing device. Within the device, the connection present between the in- and output port is removed, and a connection is made between the input port and the first connection point of the extension element and between the output port and the second connection point of the extension element. In another embodiment, the device is a new device which was not previously in use, and on installation of the new device, the extension element is arranged in the housing. In both embodiments, the extension element is located within the device after installation. This has the advantage that the device can be connected into the network in the same way as before, by connecting communication cables with the input- and output port.

Optionally, the processing unit is configured:

to interpret control data and configuration settings received via the first connection point and to transmit the control data and configuration settings to the control unit via the third connection point;

to request one or more characteristics of the device via the third connection point, and to transmit the characteristics via the first connection point.

This means that the processing unit comprises a certain type of logic, by means of which received data is interpreted and a given output is generated on the basis thereof. Thus, the processing unit is configured to interpret control data and to transmit same to the control unit. Control data refers to the data for the normal control of the functions on a device, for example turning the light on or off, setting the desired light intensity or colour, the desired sound volume, making a décor element move in a certain way, etc. When the processing unit receives control data, it can decide to transmit the control data to the control unit only if the data are intended for the respective device. In another embodiment, the processing unit can still transmit control data, and it is the control unit itself which determines whether the data are intended for the device. The processing unit is further configured to transmit configuration settings to the control unit. For example, these may be settings such as the assigned start address which are sent by the central control element. The processing unit is further configured to request one or more characteristics of the device from the control unit. For example, these may be an identifier or ID of the device, or certain data such as the duration for which a light has already been on. These requested characteristics can be sent by the processing unit to the central control element.

Optionally, the extension element is adapted to control the device according to a protocol, wherein the protocol defines the composition of a data frame, the data frame comprising a sequence of control data intended for successive devices in the network, and a break period preceding the sequence of control data. A protocol refers to a communication protocol, defining a set of rules for communication in a network. In an embodiment, the protocol is the DMX512 protocol, which is the protocol that is typically used for controlling devices in an entertainment installation such as lights or fog machines. The protocol defines how a data frame is composed, i.e. which predefined sequence is used each time control data is sent towards the devices. The data frame comprises a break period preceding a sequence of control data. The control data is the actual data, e.g. for turning a light on or changing its colour. For example, in DMX512 the sequence of control data consists of 512 data slots corresponding to the 512 channels available in DMX. Each device is assigned a number of those 512 channels, and each channel is used to control a given function on the device. A break period is included in the first part of the data frame. A break period refers to a certain waiting period, i.e. a certain time that, although the data frame has been started, no actual control data is being sent. For example, DMX512 specifies a "BREAK" followed by a "MARK AFTER BREAK" in the first part of a data frame.

Using the invented extension element in combination with a protocol specifying a break period in the data frame, allows to obtain very accurate synchronisation when simultaneously controlling multiple devices. Indeed, when the extension element is used in serial mode, the element will typically be in the idle status when no control data is being sent, thereby allowing a device to exchange messages with the central control element, e.g. according to RDM. As soon as start of a data frame is detected by an extension element, the status will be changed to forward status, to allow for direct transmission over the read-write or write-read connection. Each extension element in the chain will require some time to put his read-write/write-read connection in such a forward status. By including a break period at the start of a data frame, all extension elements in the chain will be put in forward status at the time the first extension element in the chain starts to receive the actual sequence of control data. As a result, the actual control data will be transmitted extremely fast over the successive extension elements, each time using the direct read-write/write-read connection. As no delay is introduced by an extension element when forwarding the actual control data, each device in the chain receives the control sequence at quasi the same moment. In this way, a very accurate synchronisation is obtained between the multiple devices in the chain. For example, every light in the chain will change its colour at exactly the same moment. As a result, a serial type of topology can be used, while still obtaining the same synchronised control as when using a classical bus topology.

Optionally, the processing unit is configured to change the status from idle status to forward status upon start of a data frame, and to change the status from forward status to idle status upon end of the data frame. This means that, when start of a data frame is detected by the processing unit, the processing unit adapts a selected impedance so as to put the extension element in forward status, thereby enabling direct transmission over the respective read-write or write-read connection. Depending on the direction of the data flow, either the read-write or write-read connection will be used. This allows for direct transmission over the respective read-write or write-read connection. When the end of the data frame is detected by the extension element, the extension element is put back into idle status. This allows a device to exchange messages with the central control panel, e.g. according to the RDM protocol. For example, the central control element may request the actual temperature of a device in the network. In an embodiment, the start of a data frame is detected whenever the common bus, present between successive devices, becomes active. The bus becoming active means that data will be sent by the central control element, thereby triggering the RS-485 drivers in the first/second interface of the extension element to make a balanced signal, according to RS-485. For example, a transition from mark level to break level may be detected indicating that the bus becomes active. As the processing unit of the extension element will detect such a change on the first/second interface, this will trigger the processing unit to put the extension element in forward mode.

Optionally, the processing unit comprises a data tracker configured to actively follow the data frame while being transmitted via said read-write connection or said write-read connection, and to detect the end of the data frame based on the data frame composition defined by the protocol.

This means that, when a data frame is transmitted via the direct read-write/write-read connection, the processing unit is continuously reading the data passing by. For this purpose, the processing unit comprises a data tracker, which may also be referred to as data parser or protocol follower. The processing unit may be programmed, such that it knows the standard frame composition as defined in the used protocol. In this way, by actively tracking the data frame, the processing unit knows when the data frame has come to an end. For example, when the DMX512 protocol is used, the processing unit detects the end of a data frame when a control sequence corresponding to 512 channels has passed by. In this way, by actively tracking data frames defined by the rules of a specific protocol, a very flexible way is obtained to detect the end of a data frame, and therefore to switch the extension element back from forward status to idle status. Indeed, even when the time duration for transmitting the control data cannot be predicted, the processing unit programmed according to specific rules of the protocol, can always detect the end of a frame. Such a methodology can be used in combination with any type of protocol.

Optionally, the processing unit is configured to identify a neighbouring device by successively opening the switch, sending a request to the neighbouring device via the second connection point, and receiving a response comprising an identifier of the neighbouring device. This means that the processing unit comprises a certain type of logic that allows such sequence to be carried out. This may be used when the network is controlled in bus mode, but for initial configuration purposes, respective switches can be opened to allow the central control element to determine the order of the successive devices in the network.

Further optionally, the processing unit is configured to identify a neighbouring device by, in the open state of the switch, successively bringing the extension element into the idle state, sending a request to the neighbouring device via the second connection point, and receiving a response comprising an identifier of the neighbouring device. This means that the processing unit comprises a certain type of logic that allows such sequence to be carried out. This may be used when the network is controlled in serial mode, but for initial configuration purposes, respective read-write/write-read connections can be disabled to allow the central control element to determine the order of the successive devices in the network.

Optionally, the processing unit is configured to detect a defect in the second respectively first communication cable by monitoring the second respectively first interface, and on detecting an anomaly, opening the switch and sending an error message via the first respectively second interface. This may be used when the network is controlled in bus mode, but selected switches need to be opened to isolate a cable having a defect. A defect in a communication cable is, for example, a short in this cable. A defect in the cable connected to the second connection point is detected by monitoring the second interface. A defect in the cable connected to the first connection point is detected by monitoring the first interface. The monitoring can take place in various ways. For example, communication takes place via differential signalling, and shows a voltage difference between two signal lines different from zero on the occurrence of a defect. In another embodiment, use is made of the read and write port of the two interfaces to detect a defect.

Furthermore, the processing unit is configured to open the switch on detecting an anomaly. By opening the switch, the bus is interrupted at this location. As a result, no bus traffic is possible on the portion of the bus in which the defect is located, but it is on the other portion of the bus. Via this last portion of the bus, an error message can also be sent by the processing unit to the central control element. In this way, it is automatically detected in which cable a defect has occurred. Additionally, the data traffic can be restored. Indeed, the two extension elements, on either side of the defective cable, will detect the defect and open their switch. In this way, the cable with the defect is isolated from the bus, and the bus can again be use for data traffic along either side. This results in an increased reliability of the solution.

According to a second aspect of the invention, a device is provided, wherein the device is suitable for being connected via a first and second communication cable to other devices in a linear network with bus topology, and the device comprises:

an electrical and/or mechanical component;
  a control unit suitable for controlling the electrical or mechanical component;
  an extension element according to the first aspect of the invention, wherein the third connection point of the extension element is connected to the control unit.

The network, the bus topology, the communication cables and the device are defined as described above. The device is suitable for being connected via a first and second communication cable to other devices in a linear network with bus topology. For example, the device has an input port and an output port, and a communication cable is connected into the output port of one device and into the input port of the subsequent device. The device is suitable for being connected with other devices in a network with bus topology.

The device comprises an electrical and/or mechanical component, for example a light, loudspeaker, motor for bringing about a certain movement, etc. The device further comprises a control unit suitable for controlling the electrical or mechanical component. A control unit is a controller or regulator, suitable for controlling various functions on the device on the basis of received control data, for example turning the light on or off, setting the desired light intensity or colour, the desired sound volume, making a décor element move in a certain way, etc.

The extension element is embodied according to one of the embodiments described above. The extension element is a physical component, for example embodied as a printed circuit board (PCB). For example, the device has a housing or an enclosure and the extension element is arranged within the enclosure of the existing device. In another embodiment, the extension element is embodied as a separate apparatus, with its own enclosure, and this apparatus can be connected to an existing device so that they can both work together, and together form a new device. In yet another embodiment, the extension element is a component of a device to be newly assembled, i.e. a device that was not previously in use. For example, the new device comprises a PCB, on which elements are arranged corresponding to the design of the extension element.

The third connection point of the extension element is connected to the control unit. In one embodiment, the first connection point of the extension element is connected to the input port of the device, and the second connection point is connected to the output port of the device.

According to a third aspect of the invention, a system for controlling a network of devices, is provided, wherein the system comprises:

one or more devices according to the second aspect of the invention;
  a central control element;

one or more communication cables, wherein each communication cable connects two of the devices to one another or connects one of the devices to the central control element, wherein the central control element is configured to transmit data to and to receive data from the network.

The system thus comprises one or more devices as defined above, one or more communication cables as defined above, and a central control element. The devices are mutually connected using a communication cable, so that a chain is formed. The first device of the chain is connected to the central control element. A central control element is, for example, a light console, sound console or computer. It is also possible for an additional component to be present between the central control element and the first device, for example an Ethernet-DMX converter. Additionally, it is possible for the network to be connected in a ring, wherein the central control element is connected to the first device in the chain and to the last device in the chain. The central control element is configured to send data to and to receive data from the network. Various types of data are possible, such as control data, identification data, characteristics, configuration settings, messages, requests, etc. Each of the devices comprised in the system comprises an extension element, according to one of the embodiments defined above. The extension elements allow the network to be controlled either in bus mode or in serial mode. Indeed, when the switch of each extension element is in closed state, control data can be sent over the common bus of the network. When the switch of each extension element is in open state, control data can be sent over the direct read-write/write-read connection present in each extension element, after the latter has been put in forward status.

Optionally, the central control element comprises a topology module configured to determine the order of the devices in the network by successively:

in the closed state of the switch in each of the devices, transmitting a command over the common bus to open the switch;

sending a request to successively return an identifier, close the switch, and no longer respond in the case of a subsequent request, and repeating this request until an identifier has been received for each of the devices.

This can be used when the network is controlled in bus mode, but for configuration purposes, switches are temporarily opened for determining the order of the devices in the network. Determining the order of the devices in the network refers to identifying, which is the first device connected in the chain, which is the second device connected to the first device, etc. The central control element comprises a topology module, which makes it possible, by carrying out a certain sequence, to determine this order of devices. This sequence is based on successively opening the various switches and identifying a corresponding device each time. In this way, the order can be determined automatically. This contributes to a more efficient and less error-prone configuration of the system.

Optionally, the central control element comprises a topology module configured to determine the order of the devices in the network by successively:

transmitting a command, such that the extension element of each of the devices identifies a neighbouring device;

requesting, from each of the devices, an identifier of the device and of an identified neighbouring device.

This relates to a second possible embodiment of a topology module, used upon configuration, while normal control of the network is done in bus mode. The topology module allows to, upon initial configuration, determine the order of the devices connected in the network. For this, the network has to comprise devices with an extension element that is suitable for identifying a neighbouring device. The topology module makes it possible, by carrying out a certain sequence, to determine this order of devices. This sequence is based on each individual device identifying a neighbouring device. In this way, the determination of the order can take place automatically, which contributes to a more efficient and less error-prone configuration of the system. This method for determining the order is additionally faster than the method described in the preceding embodiment, given that it is not necessary to wait for a response from the network each time.

Optionally, the central control element and the devices are connected in a ring, and the central control element comprises a self-healing module, configured to identify, on receiving an error message from one of the devices, the communication cable with the defect and to adapt the data traffic accordingly. A ring refers to a network in which the central control element is connected to the first device of the chain and to the last device in the chain. The central control element comprises a self-healing module by means of which, on the occurrence of a defect in a communication cable, for example a short, the data traffic can be restored when the network is controlled in bus mode. The network has to comprise devices with an extension element that is suitable for detecting a defect in a communication cable. On detecting an anomaly, the switch of the extension elements on either side of the defective cable is opened, and an error message is sent to the central control element. The central control element will adapt the data traffic accordingly. For example, one portion of the chain is reached by sending data from the central control element to the first device, second device, etc., and the other portion of the chain by sending data from the central control element to the last device, penultimate device, etc. In this way, the data traffic over the bus is automatically restored, which results in an increased reliability of the solution.

Optionally, the central control element comprises a configuration module configured to transmit a configuration setting to one or more of the devices. For example, after identifying the connected devices and their order, a message is sent addressed to a device in which the start address is allocated to the device. The entire configuration can proceed automatically in this way.

According to a fourth aspect of the invention, a method for communication in a network of devices, is provided, wherein the devices are mutually connected via a first and second communication cable, wherein said network has a linear bus topology, and wherein the method comprises:

providing an extension element for each of the devices, comprising: a first, second and third connection point, a switch connected to the first and second connection point, a processing unit connected to the third connection point and to the first and/or second connection point over a connection which does not comprise the switch, a first and a second interface adapted for data exchange between the first respectively second connection point and the processing unit, a read-write connection between the read port of the first interface and the write port of the second interface, and a write-read connection between the write port of the first interface and the read port of the second interface, connecting the first respectively second connection point, to the first respectively second communication cable;

connecting the third connection point to a control unit
comprised in each of the devices;

closing the switch by the processing unit, such that a
direct connection is present between the first and sec-
ond connection point, which forms part of the common
bus of the network, thereby controlling the network in
bus mode;

opening the switch by the processing unit, such that this
direct connection is broken, thereby controlling the
network in serial mode, in the serial mode, changing, by said processing unit, the
impedance in the read-write connection and/or in said
write-read connection and/or in a connection between
the first and second interface via the processing unit,
thereby changing the status of the extension element
from an idle status, wherein no data traffic is possible
over the read-write and write-read connection, to a
forward status, wherein data traffic is possible over the
read-write or write-read connection.

Optionally, the method further comprises:

controlling the network in serial mode;

upon detection of start of a data frame by the extension
element of successive devices: bringing the extension
element in forward status;

transmitting a data frame via the read-write connection or
write-read connection of successive devices;

upon detection of end of a data frame by the extension
element of successive devices: bringing the extension
element in idle status.

This means that the network is controlled in serial mode,
the switches of all extension elements thus being opened.
Upon detection of start of a data frame, every extension
element is put into the forward status, allowing for a direct
connection over the successive read-write or write-read
connections. Upon detection of end of the data frame, every
extension element is put back in idle modus, impeding data
traffic over the read-write/write-read connection of an exten-
sion element.

Optionally, the break period of the data frame is such that
the time for successively bringing the extension element of
successive devices in forward status is smaller than the
break period. This means that the break period included in
the data frame allows all the extension elements in the chain
to be put in forward status. In other words, by the time the
first device starts to read actual control data, the last device
in the chain has just switched to forward status. This means
that the break period in the data frame needs to be aligned
with the time it takes to switch extension elements from idle
to forward status. In an embodiment, the break period may
have a standard time duration as defined in a standard
protocol, like the standard duration of a "BREAK" in the
DMX512 protocol. In that case, advantageous use is made of
a break period already defined by the protocol standard. In
another embodiment, the duration of the break period may
specifically be chosen so as to meet the requirement for
timely switching the extension elements into forward status.

DETAILED DESCRIPTION OF THE EMBODIMENTS

Figure 1:
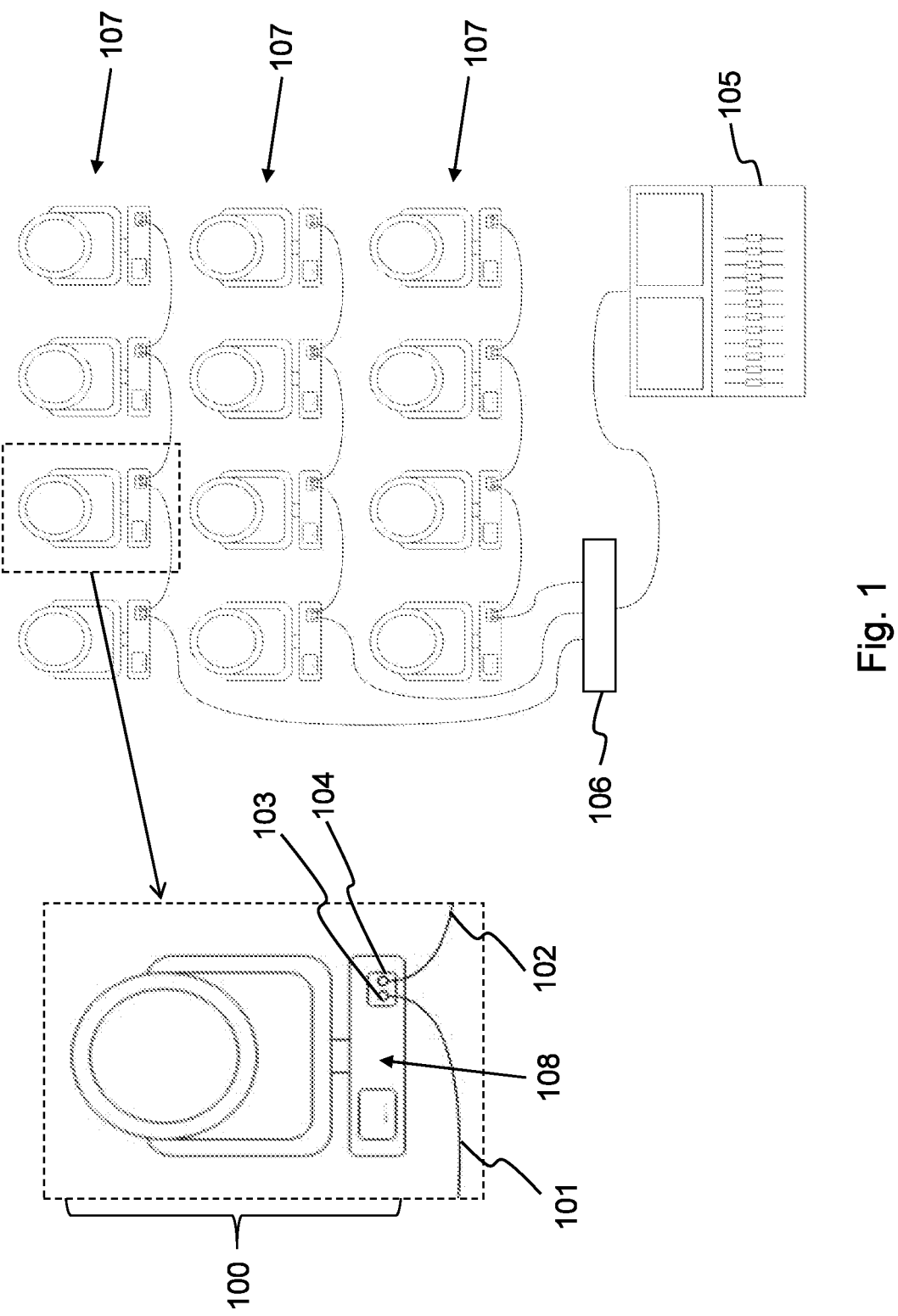
FIG. 1 illustrates an entertainment installation comprising
lights and a light console.

FIG. 1 shows a professional entertainment installation, in
which devices 100 are controlled from a central control
element 105. In the embodiment shown, the devices 100 are
spotlights, and the central control element 105 is a light
console. In the embodiment shown, use is made of the
RS-485 standard and the DMX512 protocol. Given that
DMX is limited to 512 channels by the standard, in certain
cases one DMX controller is not sufficient to connect all of
the connected devices 100. In such a case, use is made of
what are referred to as DMX universes 107, which are
parallel DMX lines used simultaneously. In the embodiment
shown, the DMX512 signal is conveyed over Ethernet
between the console 105 and an Ethernet-DMX converter
106. Here, multiple DMX universes are conveyed over one
cable. The cables for the various universes 107 then depart
from the Ethernet-DMX converter 106.

In each DMX universe 107, a chain of devices 100 is
formed, each time by connecting the output port 102 of one
device to the input port 101 of the subsequent device. For
this, use is made of communication cables 101, 102, for
example with a 3-pin or 5-pin XLR connector. The output port 102 and input port 101 are located in the housing 108 of a device 100. The representation of FIG. 1, in which only the exterior of the devices 100 is visible, may be both a conventional RS-485/DMX512 solution, known from the prior art, and a solution into which extension elements according to the invention are integrated. This is illustrated in FIG. 2 and FIG. 3.

Figure 2:
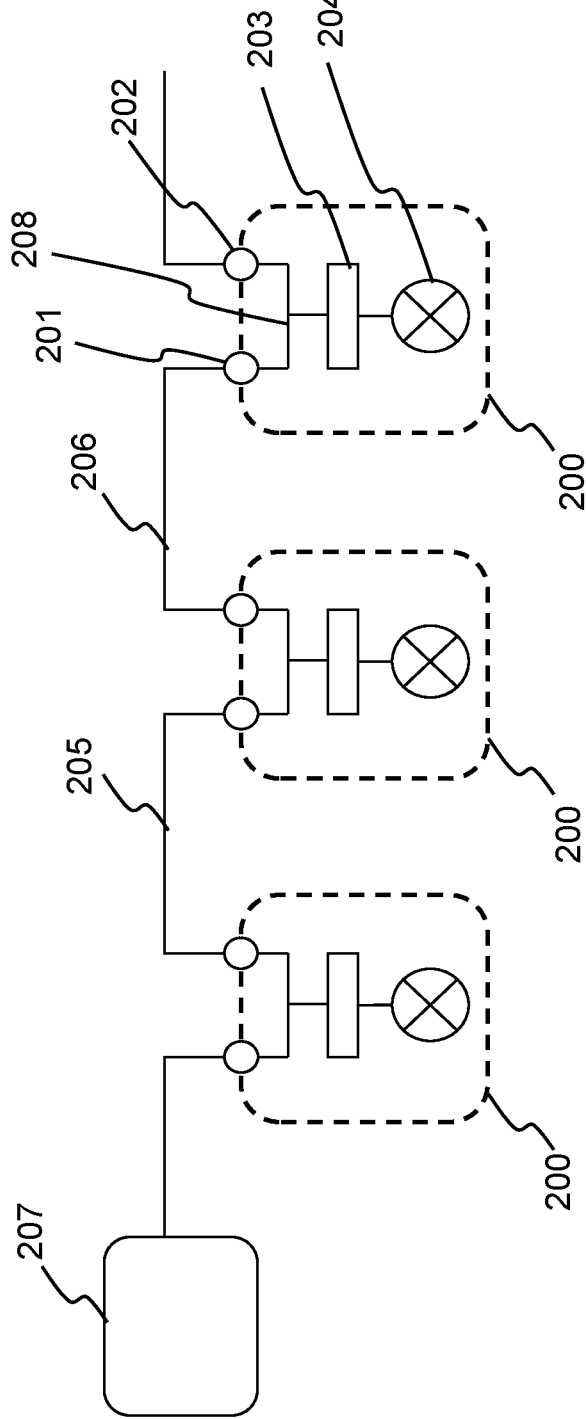
FIG. 2 schematically shows a conventional RS-485/
DMX512 solution, as known from the prior art.

FIG. 2 shows a system according to the conventional RS-485/DMX512 solution, known from the prior art. The devices 200 are controlled from a central control element 207, and are connected to one another via communication cables 205, 206. Each device 200 comprises a controller 203 and a light 204. In the device 200, the input port 201 and the output port 202 are directly connected to one another, see 208. In this way, a linear network with bus topology is created, in which the common bus of the network is formed by the communication cables 205, 206 and the direct connection 208 in each device 200. Data sent by the central control element 207 are received by each device 200.

Figure 3:
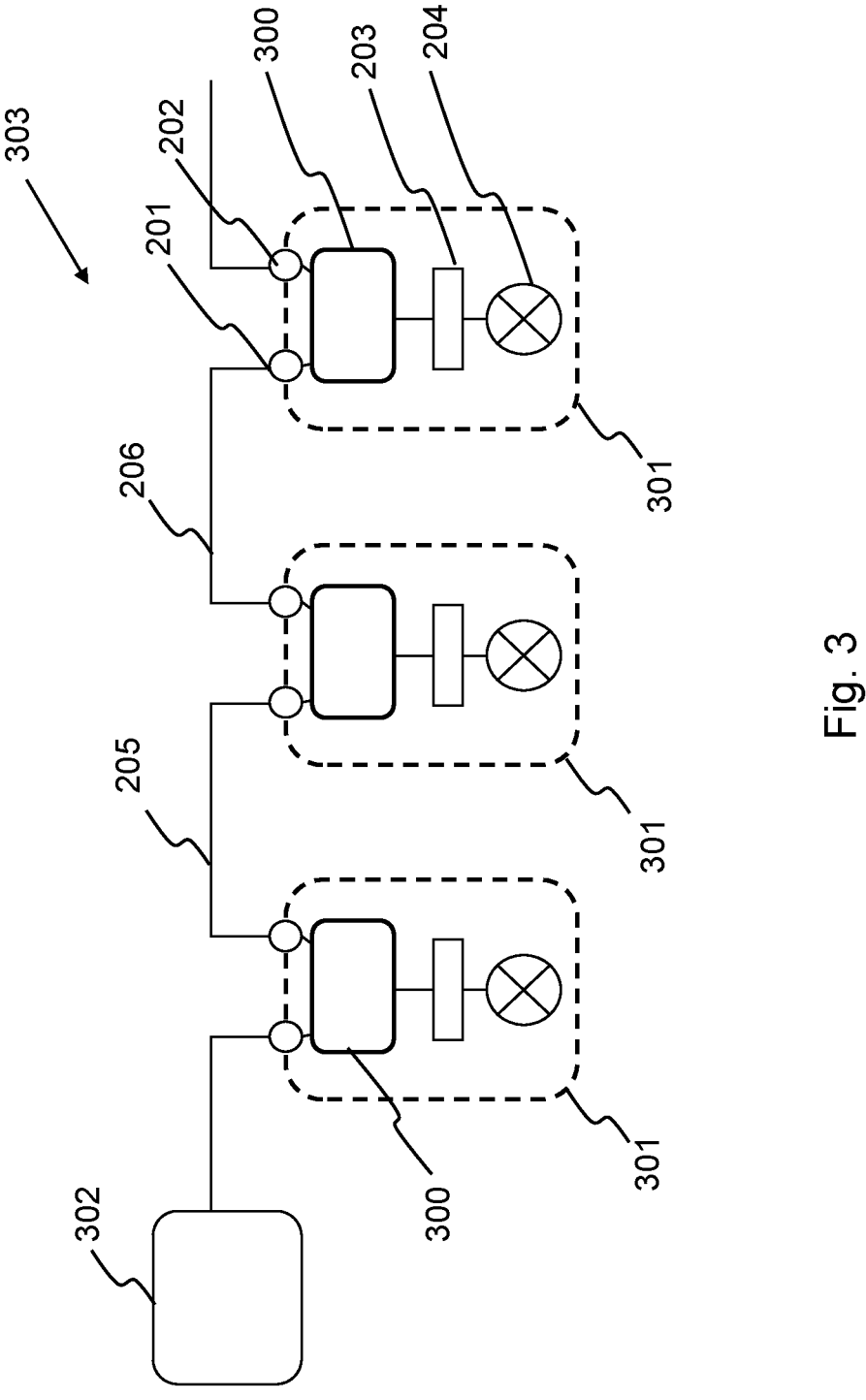
FIG. 3 schematically shows the use of an extension
element according to the invention in a system for control-
ling an installation.

FIG. 3 shows a system in which extension elements 300 are used, according to one embodiment of the invention. The devices 301 are controlled from a central control element 302. Each device 301 comprises a control unit 203, for example a controller or regulator, and an electrical element 204, for example a light 204. Each device 301 further comprises an input port 201 and an output port 202. A first communication cable 205 and a second communication cable 206 allow a device 301 to be connected to neighbouring devices 301. The communication cables 205, 206 have, for example, a 3-pin or 5-pin XLR connector. In the embodiment shown, the extension element 300 is integrated into a device 301. For example, the extension element 300 is embodied as a populated printed circuit board, and it is arranged in the housing 108 of a device 301. In this case, it may be an existing device, suitable for being used in a conventional RS-485/DMX512 solution. In this case, the installation of the extension element 300 takes place by opening the housing 108, disconnecting the direct connection 208, installing the extension element 300 and connecting it to the input and output port 201, 202. Additionally, the extension element 300 is connected to the control unit 203. In other embodiments, the extension element 300 forms a component of a new device 301, or the extension element 300 is embodied as a separate apparatus that can be connected to a device.

Figure 4:
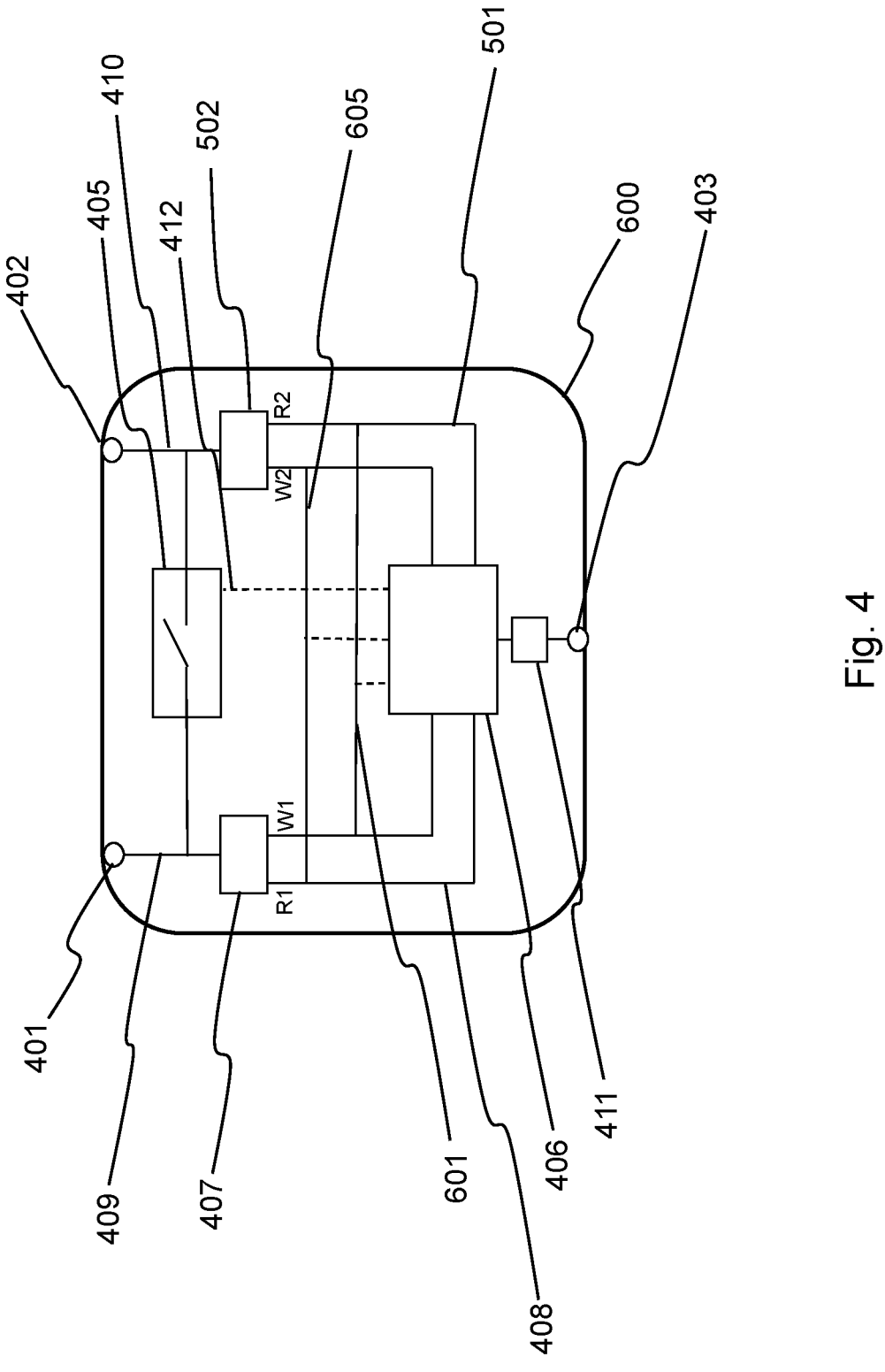
FIG. 4 schematically shows an extension element, accord-
ing to a an embodiment of the invention.
Figure 5:
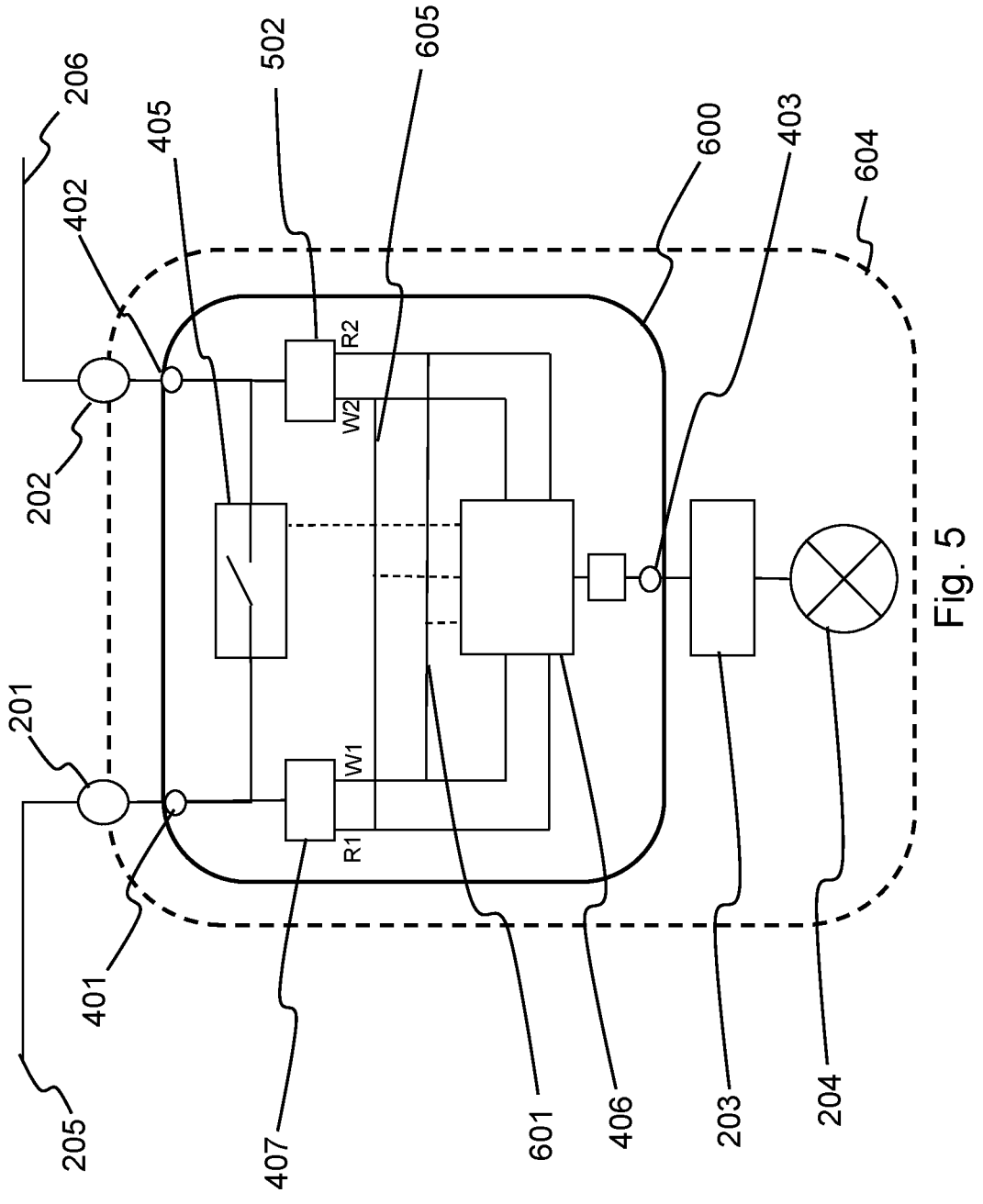
FIG. 5
illustrates the use of such an extension element within a
device.

FIG. 4 shows an embodiment of an extension element 600, while FIG. 5 shows the extension element 600 as integrated within a device 604. The device 604 comprises a control unit 203, a light 204, an input port 201 and an output port 202. By connecting a first communication cable 205 and a second communication cable 206, the device 604 is connected to other devices. The extension element 600 comprises a first connection point 401, a second connection point 402 and a third connection point 403. The connection points 401, 402, 403 are, for example, embodied as connectors arranged on a printed circuit board. In the embodiment shown, after installation of the extension element 600 in the device 604, the first connection point 401 is connected to the input port 201 and the second connection point 402 is connected to the output port 202. Furthermore, the third connection point is connected to the control unit 203.

The extension element 600 further comprises a switch 405, for example a relay. The switch 405 is connected to the first and second connection point 401, 402, via connections 409 and 410. In the closed state of the switch, a direct connection is present between the first and second connection point 401, 402, formed by connections 409, 410 and the switch 405. When the device 404 is connected in the network 303, the closed switch 405, together with the communication cables 205, 206, forms part of the common bus of the network. In the open state of the switch 405, the direct connection 409-410 between the first and second connection point 401, 402 is broken.

The extension element 600 further comprises a processing unit 406, for example a microprocessor. The processing unit 406 is connected to the third connection point 403. In the embodiment shown, an interface 411 is present between the processing unit 406 and the third connection point 403, which, for example, allows communication between the RS-485 standard on the side of the control unit 203 and another standard on the side of the microprocessor 406. That other standard is e.g. an asynchronous serial bus (UART) or other board-level serial busses as I2C and SPI. In an embodiment, the RS-232 standard may be used at the level of the processing unit. The processing unit 406 is also connected to the first connection point, over a connection 409-408 which does not comprise the switch 405. The processing unit is thus located in a branch 408 of the common bus 409-410, here to the left of the switch 405. In the embodiment shown, there is an interface 407 from the RS-485 standard of the bus to the RS-232 standard of the microprocessor 406. Similarly, there is an connection 501-410 present between the processing unit 406 and the second connection point 402, in which this connection does not comprise the switch 405. There are thus two branches 408 and 501 to the common bus 409-410 present here, in positions to both sides of the switch 405. In each of the branches 408, 501 there is an interface: a first interface 407 and a second interface 502. The processing unit 406 is configured to modify the state of the switch 405, as schematically represented by 412.

FIG. 4 further shows that the first interface 407 has a read port, denoted by "R1", and a write port, denoted by "W1". The second interface 502 has a read port, denoted by "R2", and a write port, denoted by "W2". Between the read port "R1" of the first interface 407 and the write port "W2" of the second interface 502, a connection 605 is present, referred to as the read-write connection 605. The processing unit 406 is configured to change the status of the extension element 600, as is symbolically indicated in the figure by dashed lines from the processing unit 406 to the read-write and write-read connection 601, 605. In particular, the extension element 600 may be put in forward status, wherein data traffic will proceed over either the read-write 605 or write-read connection 601. On the other hand, the extension element 600 may be put in idle status, wherein no data traffic will happen over both the read-write 605 and write-read connection 601.

Figure 6:
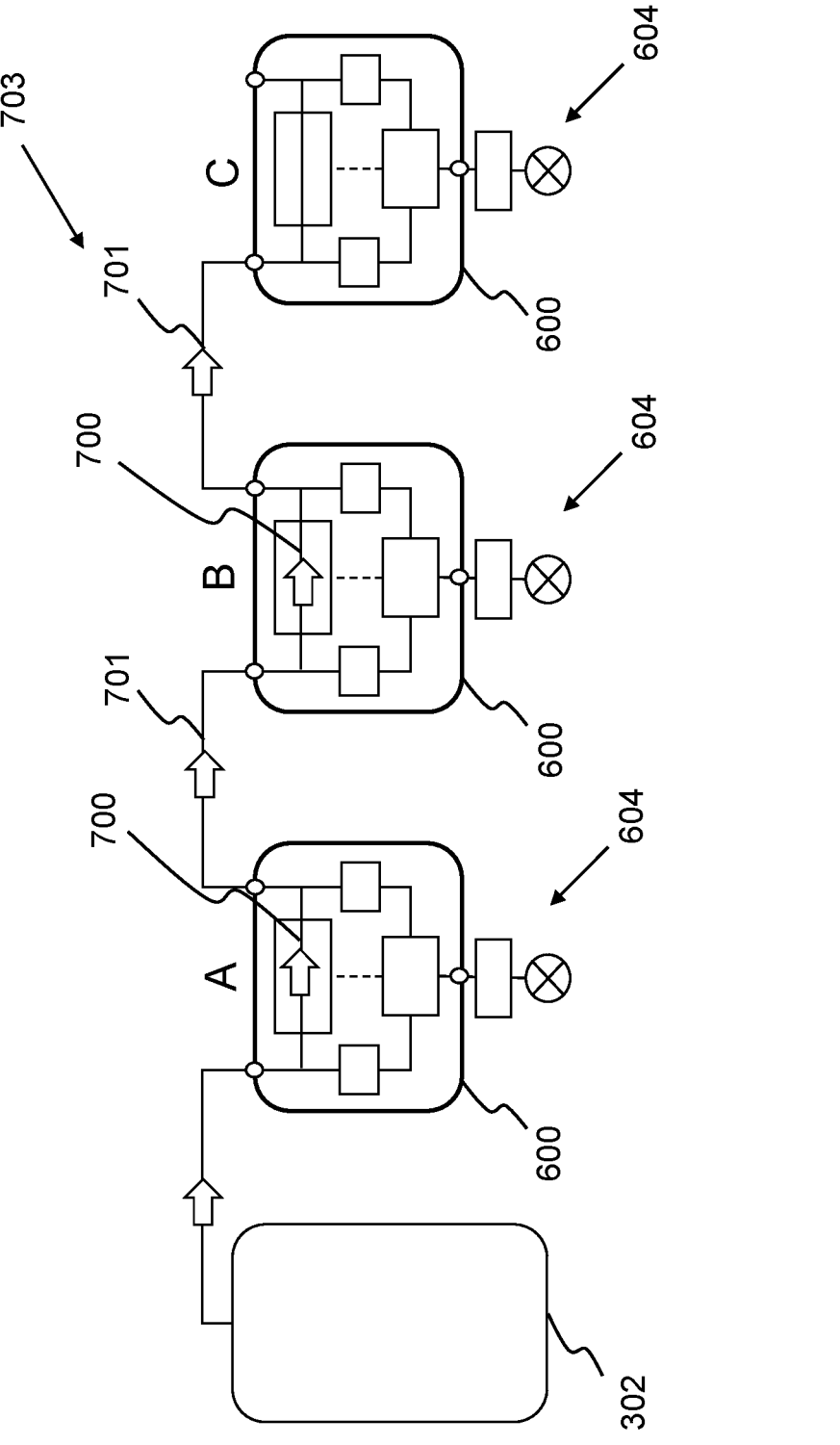
FIG. 6 illustrates the use of an extension element in a
system, according to one embodiment of the invention, in
which the common bus is used for the data traffic, the
network thereby being controlled in bus mode.
Figure 7:
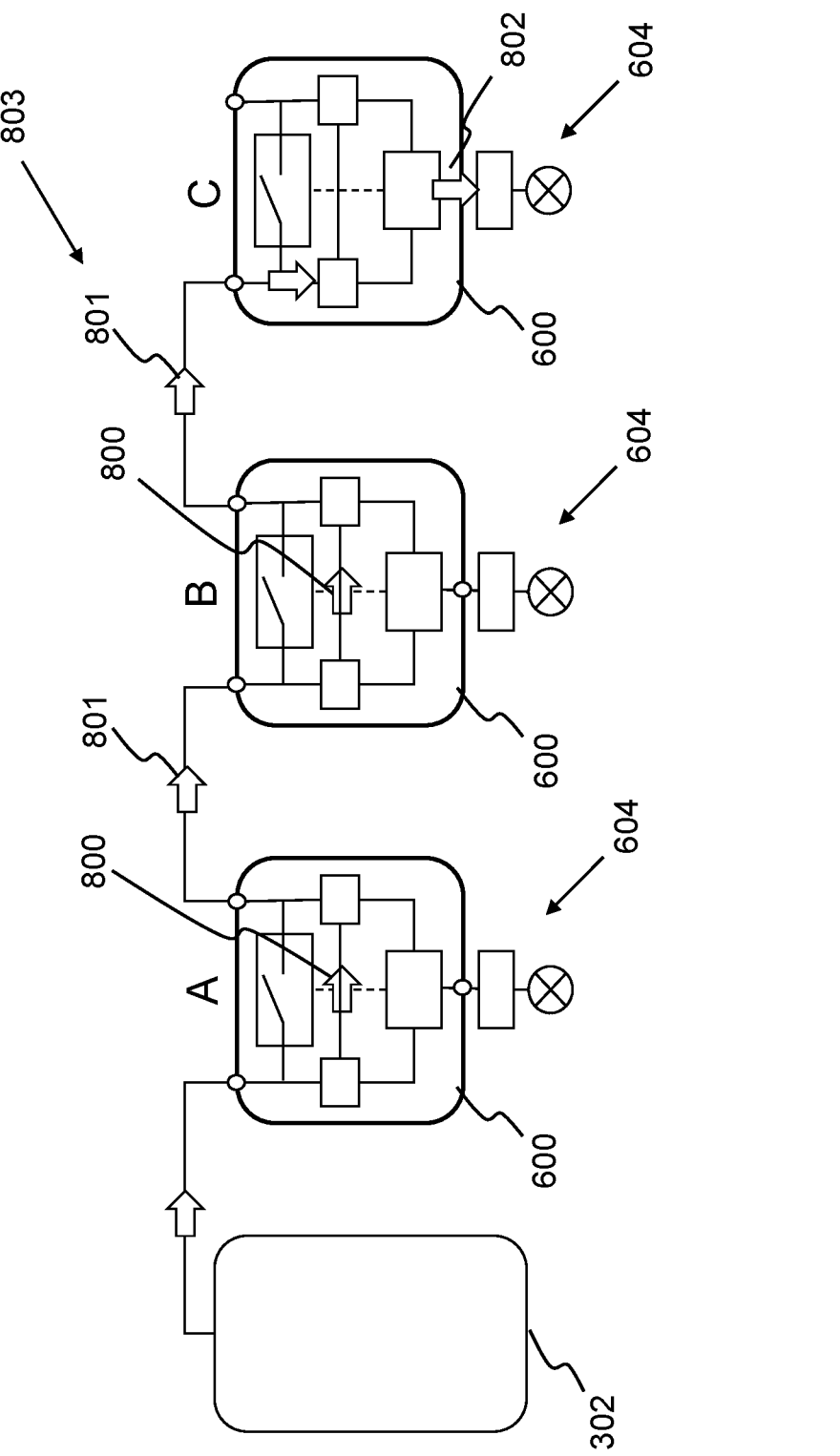
FIG. 7 illustrates the use of an extension element in a
system, according to one embodiment of the invention, in
which the connections between the two interfaces on each
extension element are used for the data traffic, the network
thereby being controlled in serial mode.

The following figures illustrate how an extension element 600 can be employed in various use cases or applications of use. More specifically, FIG. 6 and FIG. 7 illustrate the use case of normal operation, i.e. when controlling the devices on the basis of control data sent by a central control element 302. In FIG. 6, the network is controlled in bus mode, while in FIG. 7, the network is controlled in serial mode.

FIG. 7 shows the use of a system 703 in bus mode. The system 703 comprises a central control element 302, and devices 604 connected to one another via communication cables 701. Each device 604 comprises an extension element 600. For reasons of clarity, the read-write connection 605 and write-read connection 601 of an extension element 600 was not drawn in the figure. During normal operation in bus mode, each of the switches 405 is in the closed state. As a result, a direct connection 700 is formed on each extension element 600 between the first and second connection point

401, 402. Together with the communication cables 701, the direct connections 700 form the common bus of the network. Control data sent by the central control element 302 are received simultaneously by each of the devices 604. The system then operates in a manner analogous to a conventional solution with the RS-485 standard and DMX512 protocol, the latter being represented in FIG. 2. A power failure in one of the devices 604 will not disrupt the data traffic on the bus. The processing unit 406 of each of the extension elements 600 branches off from the bus 700-701, and thus receives all of the control data that are sent on the bus, and may transmit the received control data to the corresponding control unit 203, by means of which a function of the light 204 is operated.

FIG. 7 illustrates the use of a system 803 in normal operation, but controlling the network in serial mode instead of in bus mode. FIG. 7 shows that the switch 405 is open on each of the extension elements 600. As a result, no data traffic is possible over the common bus. Instead, the data traffic now proceeds over a direct connection 800 between the first interface 407 and the second interface 502 of each extension element 600. For this, use is made of the write-read connection 601 on the extension element 600. If the data traffic proceeds in the other direction, then use is made of the read-write connection 605. In this case, a serial topology is thus employed, in which consecutive interfaces each transmit data to one another. This has the advantage with respect to the bus topology that in the event of a short in a cable, not all of the data traffic comes to a halt. However, the downside is that a power failure in a device 604 will disrupt the data traffic. In the event of such a power failure, the switches 405 thus have to be temporarily closed and operation has to proceed in bus mode.

Figure 8:
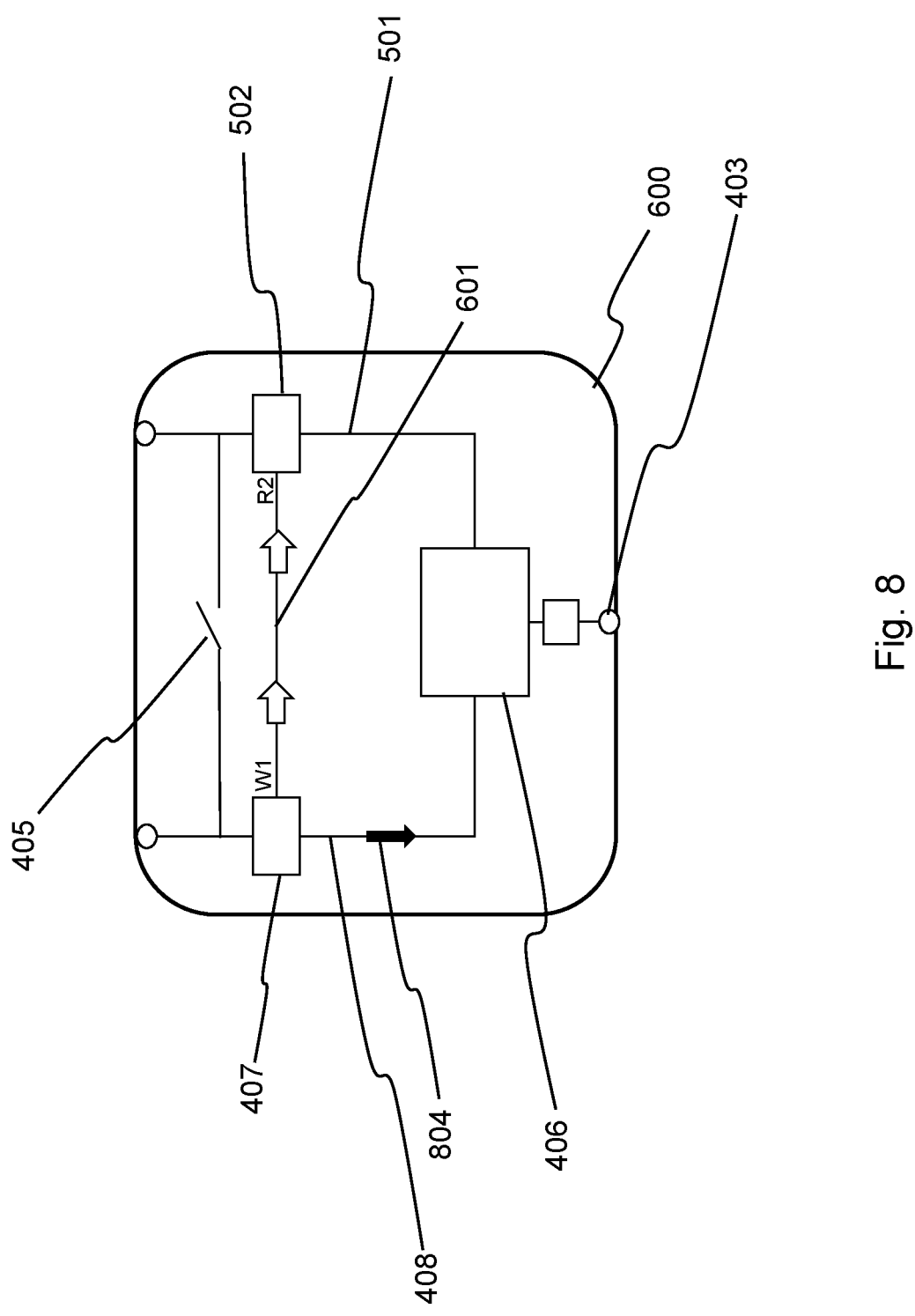
FIG. 8 schematically shows an extension element accord-
ing to an embodiment of the invention, while being in
forward status.
Figure 9:
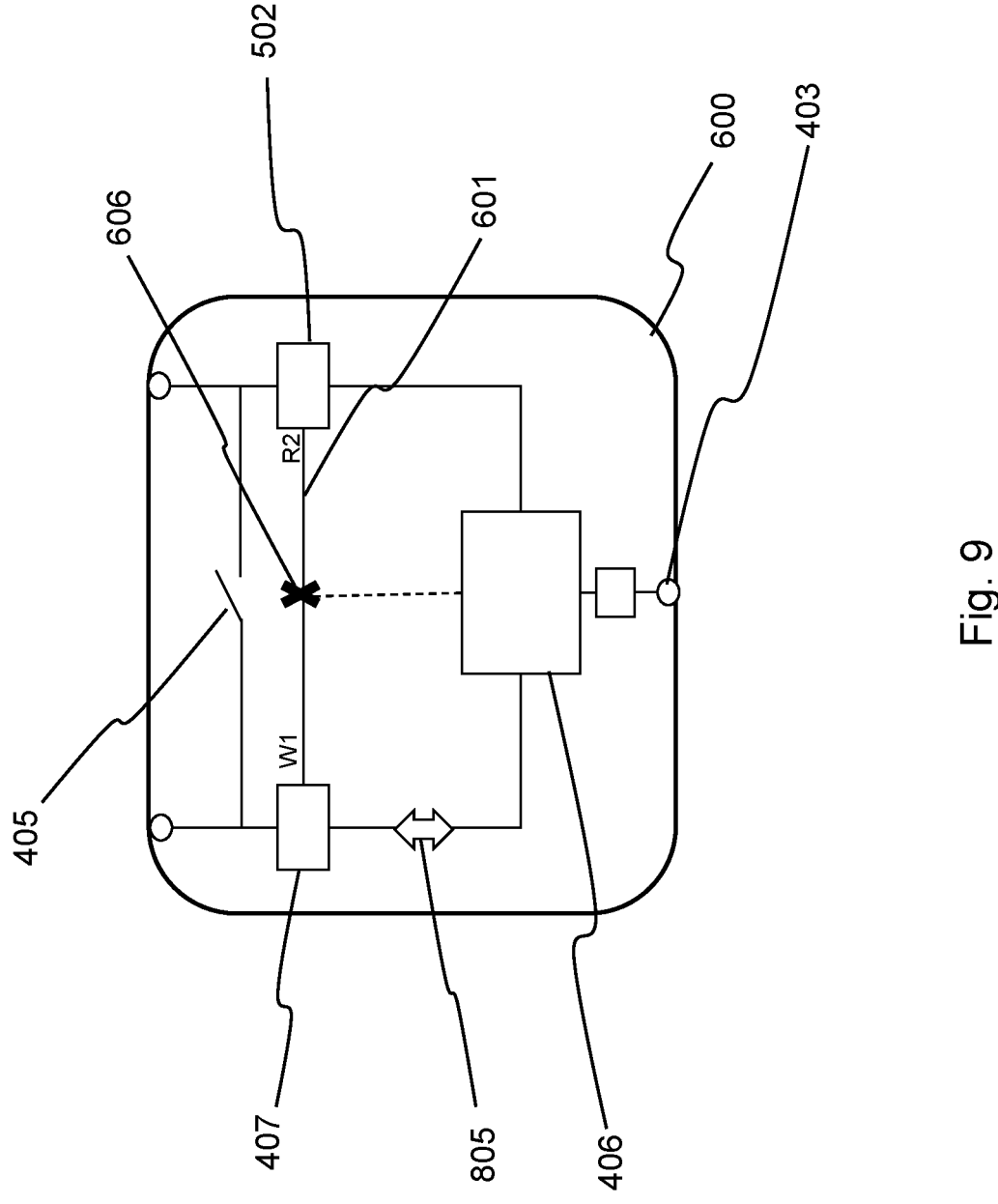
FIG. 9 schematically shows an extension element accord-
ing to an embodiment of the invention, while being in idle
status.

FIG. 8 and FIG. 9 show the extension element 600 when being put in forward state or idle state respectively. In both figures, the switch 405 is opened, showing that the network is operated in serial mode. When control data is transmitted to the devices 604, like was shown in FIG. 7, the extension elements 600 of the successive devices 604 are in forward status. However, when no control data is being exchanged, the extension elements 600 will be put in idle status. For reasons of clarity, only the write-read connection 601 is drawn in the figure. In practice, also a read-write connection 605 is present.

FIG. 8 shows that in forward status, control data is transmitted directly over the write-read connection 601. When being transmitted over the direct connection 601, the data is forwarded without any delay. The forward status is obtained by changing one or more impedances: the relative impedance of the various connections is changed in such a way that the electrical signal tends to flow along the connection 601. Moreover, during transmission of data over the extension element the processing unit 406 actively follows the data frame being transmitted, as is illustrated with 804 in FIG. 8. There are various possibilities to change the relative impedance of the various connections. For example, an impedance in the write-read connection 601 may be changed, by means of a variable resistance placed in the write-read connection 601, or by adjusting an impedance of one of the pins of the driver available in the first or second interface 407, 502. In another example, an impedance in connection 408 or 501, present between an interface and the processing unit 406 is changed. For example, a pin of the processing unit 406 may be put at low or high impedance. Also combined changes of impedances are possible. In any case, the change in impedance(s) is triggered by the processing unit 406, and the obtained relative impedances are such that the desired data path is realised.

FIG. 9 shows that in idle status, no data traffic is possible over the write-read connection 601. Similarly, no data traffic is possible over the read-write connection 605, see 606. In this case, relative impedances are changed in a way that the electrical signal only tends to flow along the path connected with the processing unit 406. In this idle status, the processing unit 406 may exchange messages with the central control element 302, see 805 in the figure. For example, a temperature of a device 604 may be requested by the control element 302, thereby using the RDM protocol.

Figure 10:
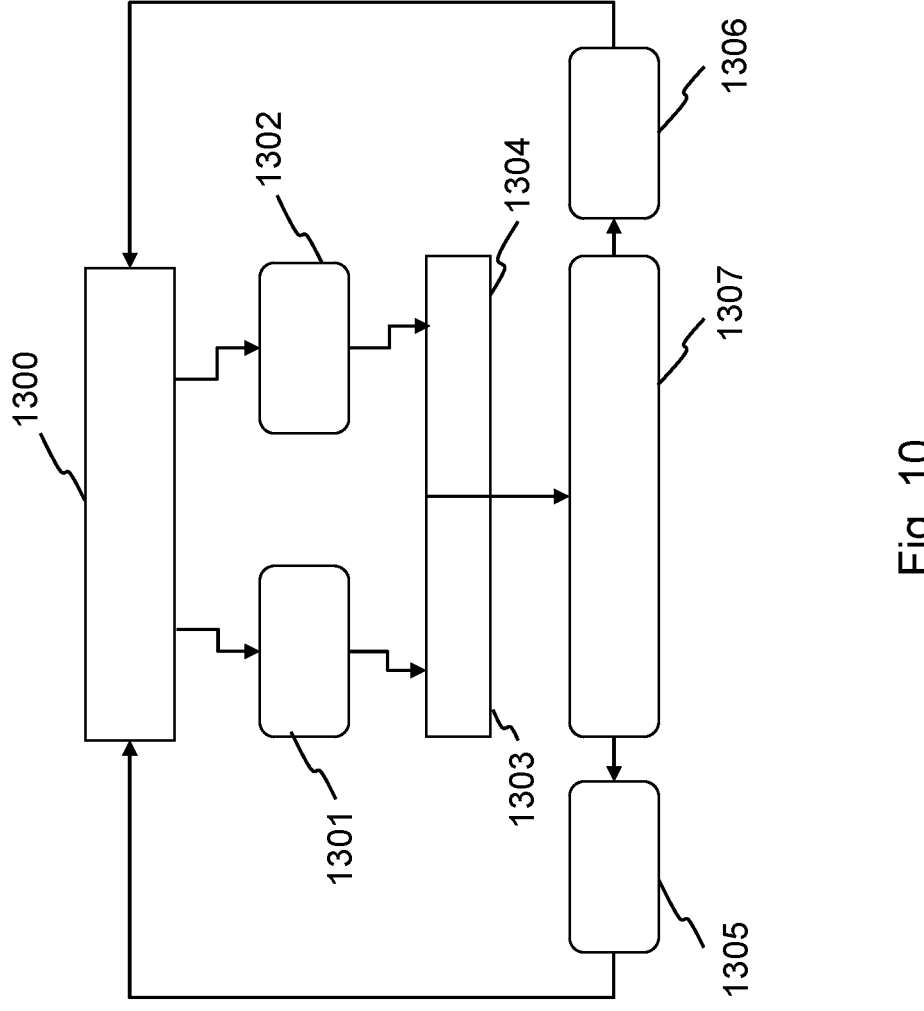
FIG. 10 gives a flow chart, illustrating the decision tree for
switching the extension element from idle status to forward
status and vice versa, according to an embodiment of the
invention.

FIG. 10 further illustrates when an extension element will be switched from idle state to forward state, and vice versa. Block 1300 represents the extension element 600 being in idle state, i.e. the state as represented in FIG. 9. When a transition is detected on the first driver 407, see block 1301, the element 600 is put into forward status, wherein data is transmitted from the first driver 407 to the second driver 502. This forward status is represented by block 1303. Similarly, when a transition is detected on the second driver 502, see block 1302, the element 600 is put into forward status, wherein data is transmitted in the opposite direction, from the second driver 502 to the second driver 501 The latter forward status, with inverse direction, is represented by block 1304. Detecting a transition on the first or second driver 407, 502 implies that it is detected that data will be sent over the bus. In this way, start of a data frame may detected by the processing unit 406. While a data frame is being transmitted over the extension element 600, the processing unit actively tracks the data that is passing by, making use of a data tracker. This is represented by block 1307. The processing unit 406 is programmed such that it knows the composition of a standard data frame, according to the used protocol. In this way, the processing unit 406 detects the end of a data packet, see blocks 1305 and 1306. Upon detection of the end of a data frame, the extension element 600 is put back in idle state, as represented by block 1300.

Figure 11:
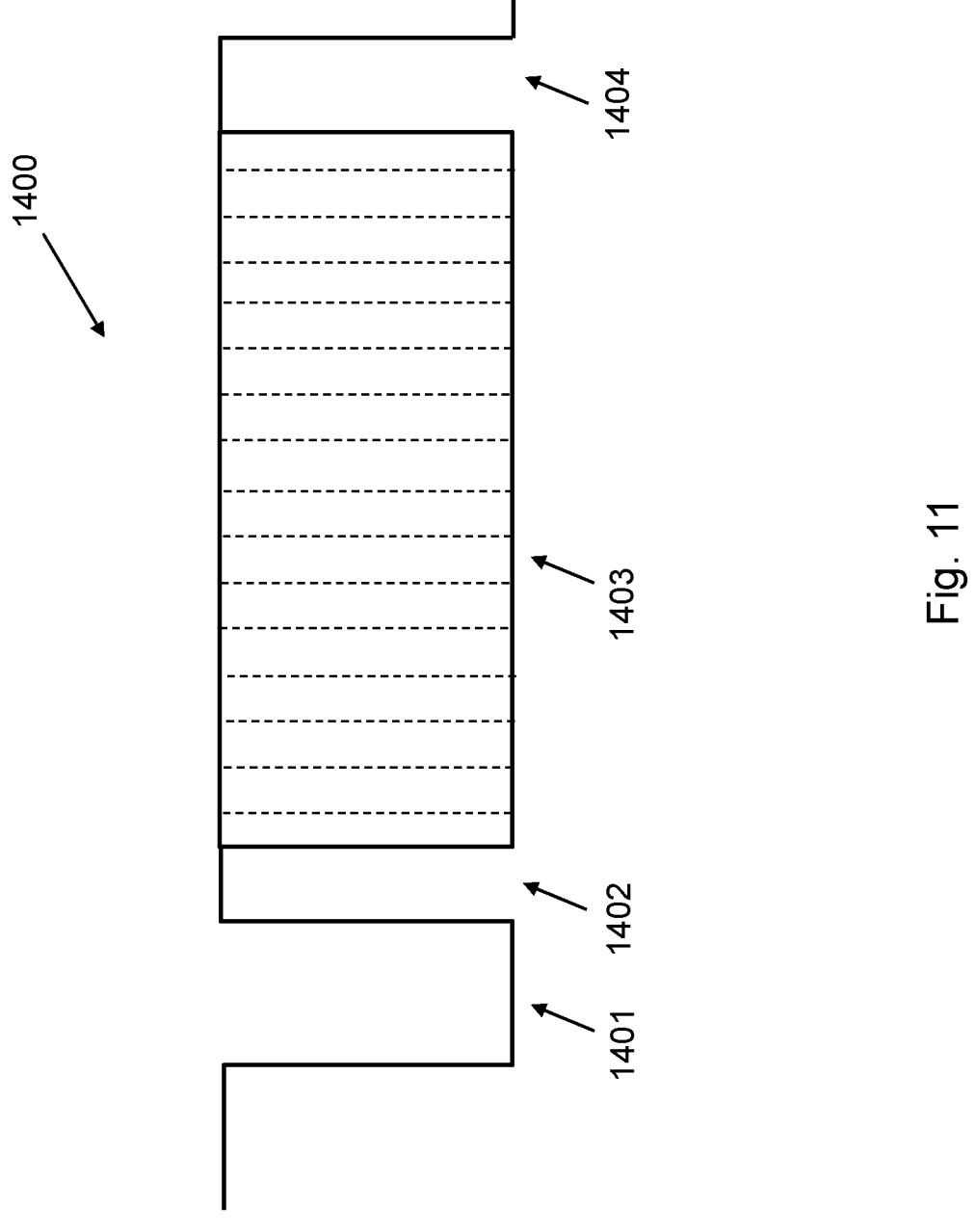
FIG. 11 illustrates the composition of a data frame.

FIG. 11 schematically represents a data frame 1400, having a composition as defined by the used protocol. In the shown embodiment, the DMX512 protocol is used for controlling the devices 604. FIG. 11 only shows schematically shows the main parts of the data frame 1400. The data frame 1400 comprises a break period 1401, followed by a mark-after-break 1402. During the break period 1401, no actual control data is transmitted. Furthermore, the data frame 1400 comprises data slots 1403, which correspond to a sequence of control data. In the DMX512 protocol, 512 slots are provided corresponding with the 512 channels available in DMX. Finally, 1404 represents a mark-before-break. In DMX512 the break (transmit) is minimally 176 microseconds, the break (receive) minimally 88 microseconds.

Upon detection of a data frame 1400 by an extension element 600, the processing unit 406 will switch the element from idle status to forward status. This is successively done by each of the consecutive elements 600 present in the network chain. Because of the break period 1401 in the data frame, the first element 600 will only start to read actual control data 1403 by the time the last element 600 in the chain was already switched to forward status. In other words: the actual control data 1403 will be transmitted throughout the chain after all elements 600 have been put in forward modus. Since in forward modus every element 600 has a direct connection 601 between both interfaces, 407, 502, the control data 1403 will be transmitted throughout the chain without any substantial delay. Test results showed that a delay of about 0.5 microseconds is obtained per extension element 600, thus being extremely small. Every device 604 thus receives its control data at quasi the same moment, thereby allowing for a very accurate synchronised control. During transmission of the data frame 1400, the procession unit 406 actively tracks the data frame 1400. Moreover, the processing unit 406 knows the standard composition of a data frame 1400, i.e. rules according to used protocol have been programmed in the logic of the processing unit 406. Based on this, the processing unit 406 can detect the end of the data frame 1400. In particular, the processing unit 406 will detect that 512 data slots in the sequence 1402 have passed through, indicating that the data frame 1400 has come to an end. Detecting the end of the data frame 1400 will trigger the processing unit 406 to put the extension element 600 back into idle status.

Figure 12:
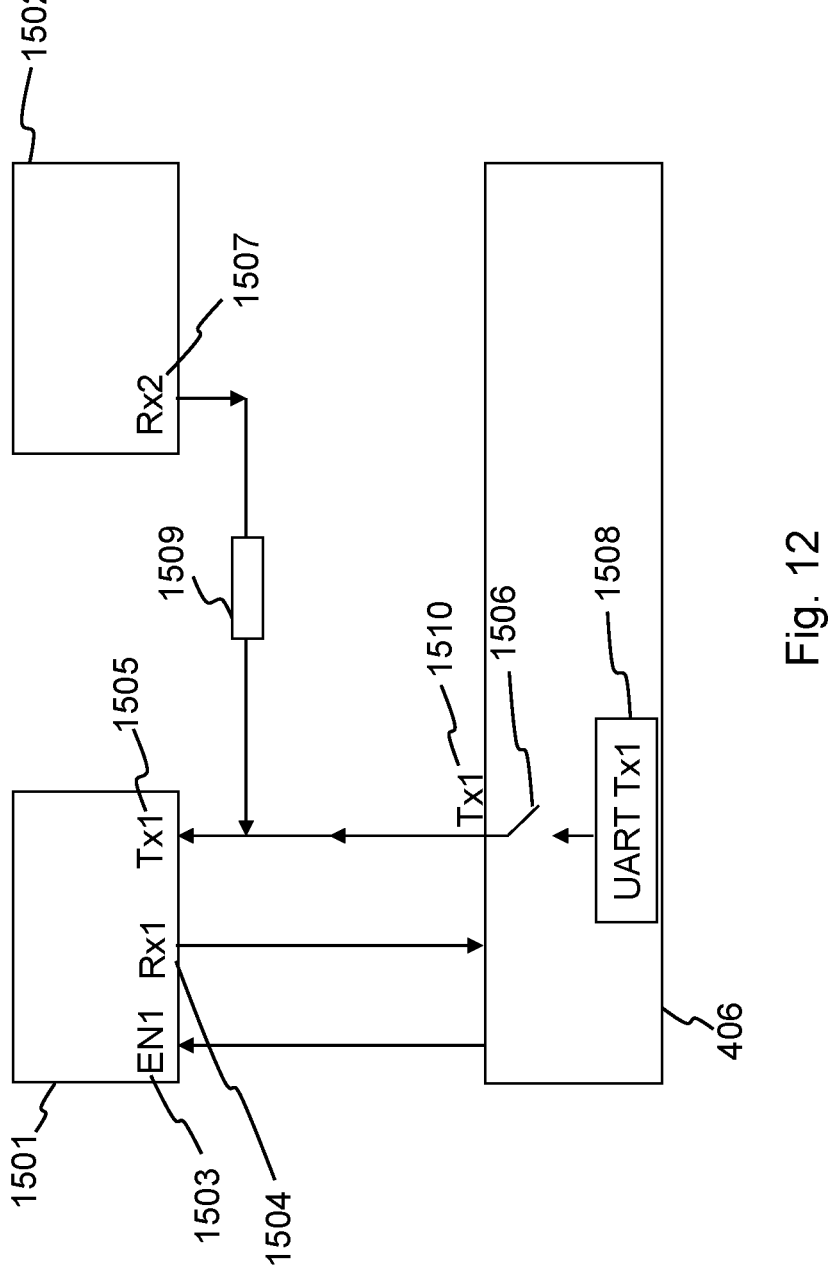
FIG. 12 illustrates an example of how the change between
idle status and forward status, by means of changing relative
impedances, may be put into practice, according an embodi-
ment of the invention.

FIG. 12 gives an example of how the change between idle status and forward status, by means of changing relative impedances, may be put into practice. FIG. 12 only shows one half; it is clear that the other half is obtained symmetrically. FIG. 12 shows the processing unit 406, being a microcontroller 406, a first RS-485 driver 1501 and a second RS-485 driver 1502. The drivers 1501 and 1502 are comprised in the first respectively second interface 407, 502 of the extension element 600. Blocks 1509 represents a conventional 10$k$ resistance, not being adjustable. Driver 1501 comprises pins or ports: Enable pin 1503, Rx1 1504, and Tx1 1505. The second driver 1502 comprises similar pins, of which only pin Rx2 1507 is drawn. The microcontroller 406 comprises an internal switch 1506, and a Tx1 pin 1510. An internal signal UART TX1 is represented by 1508.

The microcontroller 406 uses two control signals Z1 and E1 with respect to the first driver 1501, and similar two control signals Z2 and E2 with respect to the second driver 1502. The control signal Z1 serves to control the switch 1506. When Z1 is 1, then the switch 1506 is open, thereby putting the microcontroller pin TX1 1510 in high impedance. When Z1 is 0, then the switch 1506 is closed, thereby putting the microcontroller pin TX1 1510 in low impedance, connected to the internal signal UART TX1 1508. The control signal EN1 allows to enable the first driver 1501. Moreover:

Signal Rx1 1504 is always driven by the RS-485 driver 1501.
Signal EN1 1503 is always driven by the microcontroller 406.
Signal Tx1 1505 at the first driver 1501 is driven by UART-Tx1 1508 when the switch 1506 is closed (Z1=0). Signal Tx1 1505 at the first driver 1501 is driven by Rx2 1507 of the second driver 1502 via the 10$k$ resistance 1509 when the switch 1506 is open (Z1=1).

Whenever EN1 is zero, the value of Z1 is not relevant, because the value at the TX1 pin 1505 of the first driver 1501 is not being transferred to the line. When EN1 is one, a signal is being put at the first driver 1501, depending on the value of Z1: signal coming from UART_Tx1 1508 if Z1=0, signal coming from Rx2 1507 if Z1=1. Therefore, the following status changes may be obtained by controlling the control signals Z1, Z2, EN1 and EN2:

Idle status: EN1=0, EN2=0 (Z1, Z2 not relevant)
Transmit 1: EN1=1, Z1=0, EN2=0
Forward status (forward from second to first interface): EN1=1, Z1=1, EN2=0
Transmit 2: EN1=0, EN2=1, Z2=0.

Forward status (forward from first to second interface): EN1=0, EN2=1, Z2=1

This shows that for changing from idle status to forward status Z1 or Z2 is changed from 0 to 1, thereby creating a high impedance at the microcontroller pin TX1 1510. In other words: the impedance in the branch running from the microcontroller 406 is increased, thereby causing the data to flow via the direct connection between both interfaces.

Figure 13:
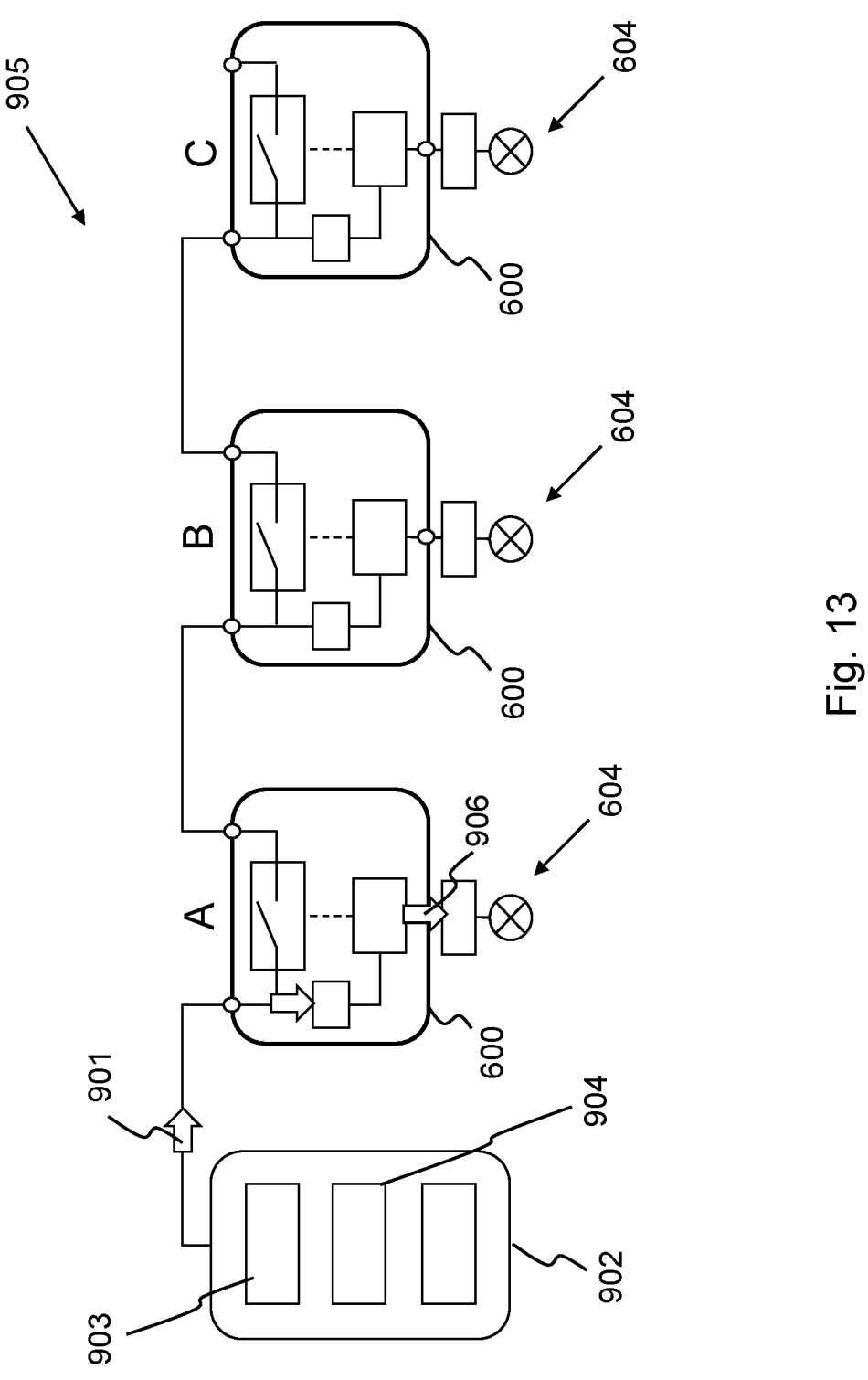
FIG. 13 illustrates the operation of a topology module,
according to one embodiment of the invention, in which the
determination of the order takes place in a first, sequential
manner.
Figure 14:
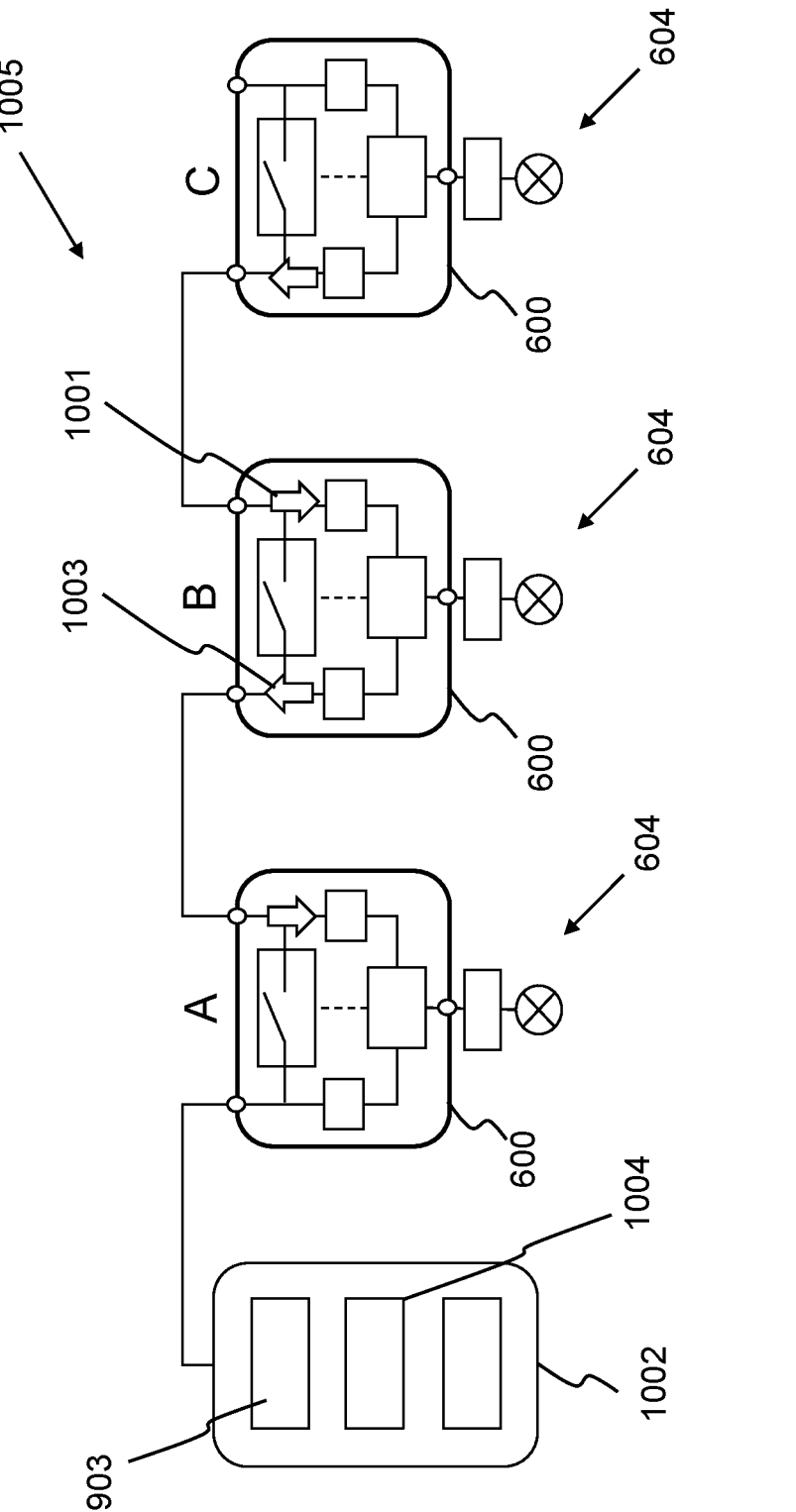
FIG. 14 illustrates the operation of a topology module,
according to one embodiment of the invention, in which the
determination of the order takes place in a second way, using
neighbour determination.

FIG. 13 and FIG. 14, illustrate the use case of determining the order of the devices in the network during initial configuration. For this, the central control element identifies which devices are connected, and in which order they are located in the network. FIG. 13 illustrates a first method for determining the order, in a sequential manner, and FIG. 14 illustrates a second method, using neighbour determination. In both cases, the network is operated in bus mode, but during initial configuration selected switches 405 are temporarily opened.

In FIG. 13, the system 905 comprises devices 604 and a central control element 902. Each device 604 comprises an extension element 600. For reasons of clarity, not every detail of an extension element 600 is drawn in the figure.

The central control element 902 comprises a topology module 904, which is configured to determine the order of the devices 604 in the network by carrying out a sequence. This sequence comprises, for example, the following steps, carried out successively:

The starting situation is one in which all of the switches 405 of the extension elements 600 are closed.
The central control element 902 sends a command over the common bus 700-701 to open the switch 405. This command is received by each of the processing units 406. All switches 405 are then opened. This situation is shown in FIG. 13. At this moment, only the first device "A" is still connected to the central control element 902 via the bus.
Next, the central control element 902 sends a request to successively return an identifier, close the switch 405, and no longer respond in the case of a subsequent request. This request is received only by the first device "A", see 906. Device "A" responds by returning its identifier, for example its ESTA code or another ID. Given that only one device is connected to the bus at this moment, multiple devices can never respond at the same time. After sending a response, device "A" closes its switch 405 and the processing unit 406 will no longer respond in the event of a subsequent request.
The central control element 902 then sends the same request again. Given that the switch 405 of device "A" is closed, this request is received by "A" and "B". However, device "A" no longer responds, thus only device "B" responds by returning its identifier.
The sending of such a request is repeated until none of the devices 404 responds. At that moment, the central control element 902 has received an identifier for each of the devices, and from the order in which this occurred, the topology module 904 determines the order of the connected devices 404 in the chain.
In this way, the order can be automatically determined by the topology module 904. The central control element 902 additionally comprises a configuration module 903. After identification and determination of the order by the topology module 904, the configuration module 903 can, for example, send a message addressed to a specific device 604, in which the start address is given. The entire configuration can proceed automatically in this way.

FIG. 14 illustrates the determination of the order of the connected devices 604 in a second way, based on neighbour determination. In FIG. 10, the system 1005 comprises devices 604 and a central control element 1002 with topology module 1004. Each device 604 comprises an extension element 600 according to the second embodiment. Again, not every detail of the extension element 600 is drawn in the figure. Additionally, the processing unit 406 of each extension element 600 is configured to identify a neighbouring device. The topology module 1004 is configured to determine, by carrying out a sequence, the order of the devices 604 in a second way, based on neighbour determination. This sequence comprises, for example, the following steps, carried out successively:

In a first step, the first device is identified, through the central control element 1002 giving the order to open all of the switches 405 and to request which is present. Given that at that moment only the first device "A" is connected to the bus, an ID of "A" is received by the topology module 1004.

All of the switches 405 are then closed again and the topology module sends the order to identify a neighbouring device. This order is received by each of the extension elements 600.

The processing unit 406 of the extension element 600 in each device 604 then carries out the required sequence to identify a neighbouring device. This situation is represented in FIG. 14. First, the processing unit 406 opens the switch 405. Next, the processing unit 406 requests an ID from the neighbouring device to its right, via the second interface 502. In FIG. 10, device "B" receives an ID via its second interface 502, and transmits its ID itself via its first interface 407, see 1001 and 1003, respectively, in the figure. The switch 405 is then closed again. Each device 604 now knows the ID of its neighbour to the right, and all of the switches 405 are closed again.

Next, the topology module 1004 send a request over the bus, addressed to the first device "A", which was identified previously in the first step. In this request, the transmission of the ID of the neighbour to the right is requested. Once this has been received, the topology module 1004 has identified the second device "B".

Next, the topology module 1004 sends a request, addressed to the second device "B", to transmit the ID of its neighbour to the right. By this being repeated by the topology module 1004, all of the devices 604 are identified and their order determined. Additionally, this method for determining the order is faster than the first, sequential method.

The above second method for determining the order of the connected devices 604, based on neighbour determination, may analogously be applied by manipulating the relative impedances instead of manipulating the switches 405. In this case, the switch 405 of each of the extension elements 600 stays open for the entire configuration phase. Neighbour determination now takes place by "opening" the read-write and write-read connections, thereby impeding transmission along these lines. In the open state of these lines, each device 604 requests the ID of its neighbour to the right, and it transmits its own ID to its neighbour on the left. After "closing" all of the connections again but with switch 405 still open, the topology module 1004 can then request all of the IDs. The "opening" and "closing" by means of changing the relative impedances allows much faster operation than neighbour determination via the opening and closing of the switch 405. In this last method, a certain waiting period, required for stabilization, has to be inserted after the closing of the switch 405. When changing an impedance to the "closed" state, such a waiting period is not necessary.

Figure 15:
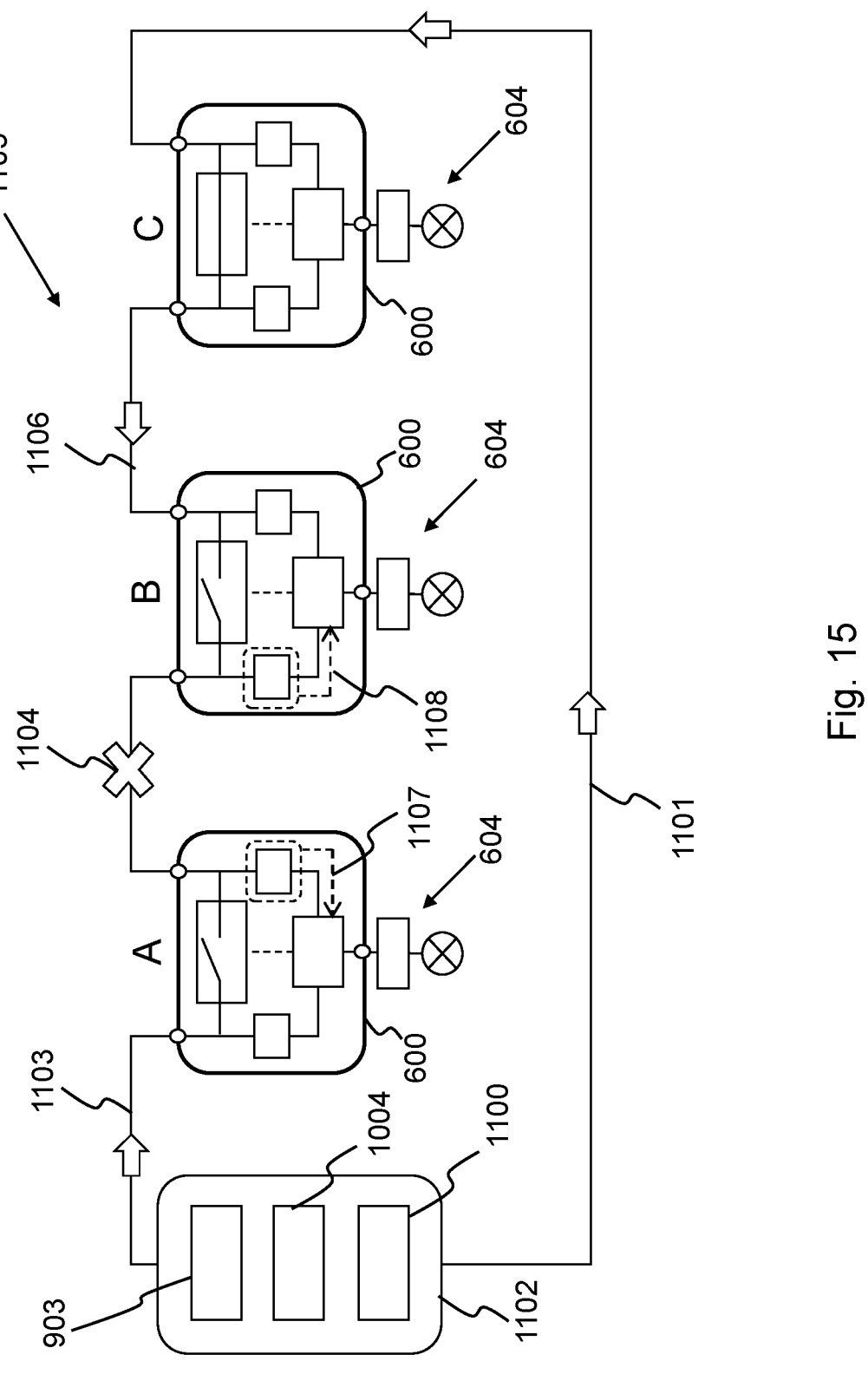
FIG. 15 illustrates the operation of a self-healing module,
with detection of an anomaly according to a possible
embodiment of the invention.

In FIG. 15, the use case is illustrated in which a short in a communication cable occurs during normal operation, while operating in bus mode. In FIG. 15, the system 1105 comprises devices 604 and a central control element 1102 with self-healing module 1004. In FIG. 15, each device 604 comprises an extension element 600. For reasons of clarity, not every detail of the extension element 600 was drawn in the figure.

The processing unit 406 of each extension element 600 is configured to detect a defect, for example a short 1104, in a connected communication cable. For this, the processing unit 406 is configured to continuously monitor the first and second interface 407, 502. For example, the voltage difference between the signal lines is continuously checked. In the case of differential signalling, this voltage difference should be zero; a deviation from zero indicates an anomaly. If an anomaly is detected by the processing unit 406, then it opens the switch 405 and sends an error message to the central control element 1102.

The central control element 1102 comprises a self-healing module 1100 by means of which, on the occurrence of a defect in a communication cable the data traffic can be restored. This takes place, for example, as follows:

A short 1104 occurs in the communication cable between device "A" and "B". All of the data traffic over the bus 700-701 then comes to a halt.

Device "A" detects the anomaly on its second interface 502, see 1107. The extension element 600 of device "A" then opens its switch 405. The bus is thus interrupted at this location, making data traffic possible over the bus left of device "A". Device "A" sends an error message to the self-healing module 1100 via this route.

Device "B" also detects the anomaly, on its first interface 407, see 1108. Device "B" also opens its switch 405. The switches 405 on both sides of the defect 1104 are now open. This situation is represented in FIG. 15. The defective cable is isolated from the network by the open switches 405. As a result, the common bus, with the exception of the defective cable 1104 can be used again, left of device "A", see 1103, and right of device "B", see 1106.

On receiving the error message, the self-healing module 1100 adapts the data traffic: device "A" is reached along the route denoted by 1103, while devices "B" and "C" are reached along the route denoted by 1101. For this, the network has to be connected in a ring, as represented in FIG. 11. In this way, the data traffic is restored automatically.

Figure 16:
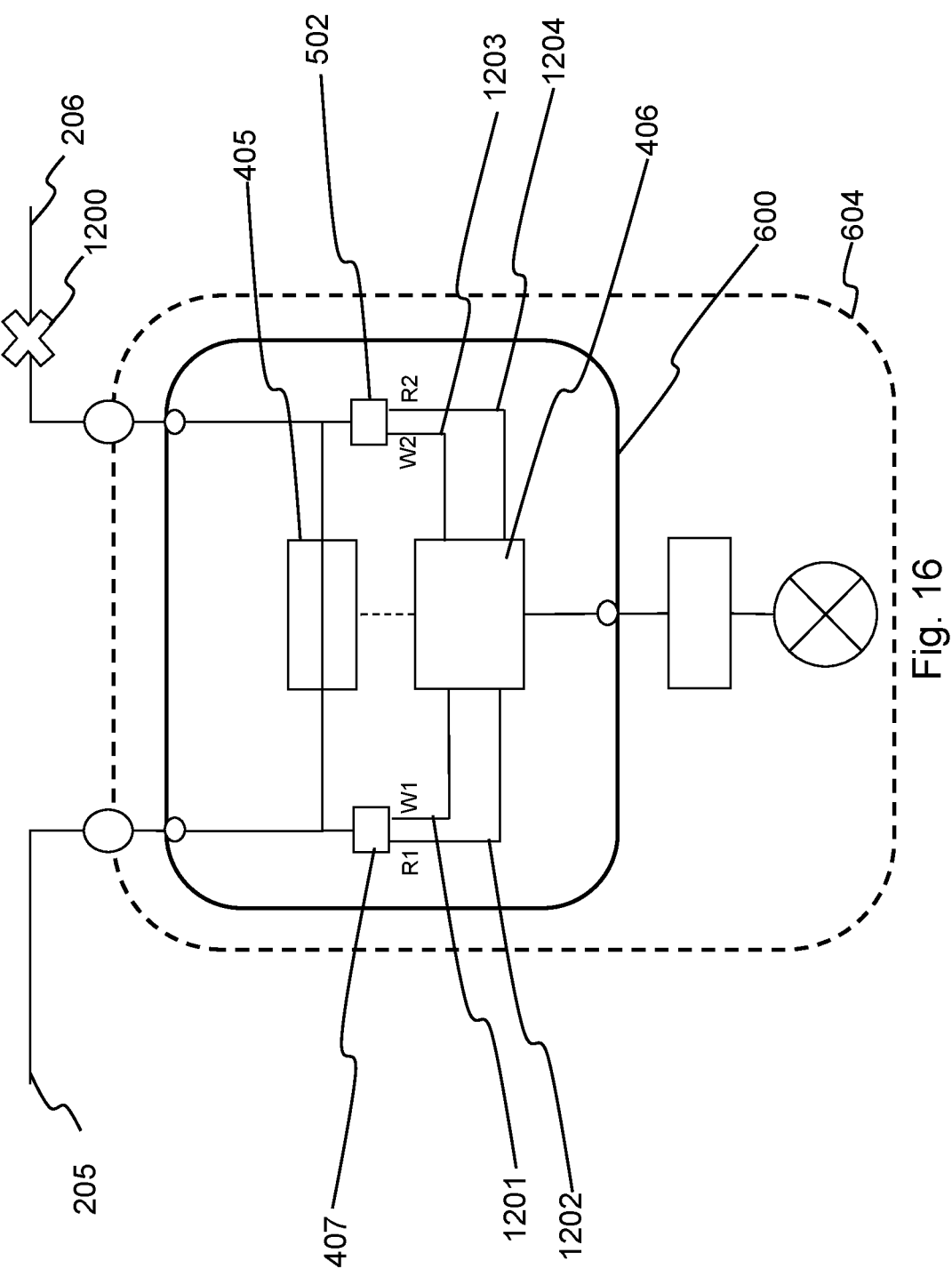
FIG. 16 illustrates the detection of an anomaly by an
extension element, according to another embodiment of the
invention.

Lastly, FIG. 16 illustrates an alternative method for monitoring the first or second interface 407, 502, in which anomaly detection is not based on a measured voltage difference, but rather use is made of the read and write port of the interfaces. In this way, the cost for an extra component for measuring voltage can be avoided. The figure shows the extension element 600. The first interface 407 comprises a read port "R1" and a write port "W1". The second interface 502 comprises a read port "R2" and a write port "W2". The processing unit 407 is configured to monitor the read and write ports. This takes place, for example, as follows:

In normal operation, the switch 405 is closed. What the processing unit 406 has sent arrives at the write port "W2" of the second interface 502, see 1203. As long as there is no defect in the cable, this also arrives, via the closed switch 405, at the read port "R1" of the first interface 407. The processing unit 406 reads this read port "R1", see 1202, and compares it with what it had sent originally. As long as it is the same, no anomaly is detected.

However, if a short 1200 occurs in the second communication cable 206, then what the processing unit 406 has sent will not arrive at the read port "R1". As a result, the processing unit detects a difference between what it had sent originally and what it now reads. In this way, the anomaly 1200 is detected.

The processing unit 406 can detect an anomaly in the first communication cable 205 in an analogous manner, see 1201 and 1204.

Although the present invention has been illustrated by means of specific embodiments, it will be clear to a person skilled in the art that the invention is not limited to the details of the above illustrative embodiments, and that the present invention can be carried out with various changes and modifications without thereby departing from the area of application of the invention. Therefore, the present embodiments have to be seen in all areas as being illustrative and non-restrictive, and the area of application of the invention is described by the attached claims and not by the above description, and any changes which fall within the meaning and scope of the claims are therefore incorporated herein. In other words, it is assumed that this covers all changes, variations or the like which fall within the area of application of the underlying basic principles and the essential attributes of which are claimed in this patent application. In addition, the reader of this patent application will understand that the terms "comprising" or "comprise" do not exclude other elements or steps, that the term "a (n)/one" does not exclude the plural and that a single element, such as a computer system, a processor or another integrated unit, can perform the functions of various auxiliary means which are mentioned in the claims. Any references in the claims cannot be interpreted as a limitation of the respective claims. The terms "first", "second", "third", "a", "b", "c" and the like, when used in the description or in the claims, are used to distinguish between similar elements or steps and do not necessarily indicate a sequential or chronological order. In the same way, the terms "top side", "bottom side", "above", "below" and the like are used for the sake of the description and do not necessarily refer to relative positions. It should be understood that these terms are interchangeable under the appropriate circumstances and that embodiments of the invention can function according to the present invention in different sequences or orientations than those described or illustrated above.

The invention claimed is:

1. An extension element for a device in a linear network with bus topology, the extension element comprising:

a first and a second connection point configured to connect to a first and a second communication cable, respectively;

a third connection point configured to connect to a control unit comprised in said device;

a switch connected to said first and said second connection points;

a processing unit connected to said third connection point, and to said first and second connection point over a connection which does not comprise said switch;

a first and a second interface adapted for data exchange between said first and said second connection point, respectively, and said processing unit;

a read-write connection between the read port of said first interface and the write port of said second interface, and a write-read connection between the write port of said first interface and the read port of said second interface, wherein, in a closed state of said switch, a direct connection is present between said first and second connection point, said direct connection not comprising said first and second interface, and, in an installed state, forming part of a common bus of said network;

wherein, in an open state of said switch, said direct connection is broken;

wherein the processing unit is configured to change the status of said extension element from an idle status, wherein no data traffic is possible over said read-write and write-read connection, to a forward status, wherein data traffic is possible over said read-write or write-read connection, by changing the impedance in said read-write connection or in said write-read connection or in a connection between said first and second interface via said processing unit.

2. The extension element according to claim 1, wherein said first and second connection point are, in an installed state, connected to an input port and an output port, respectively, comprised in a housing of said device.

3. The extension element according to claim 1, wherein said processing unit is configured:

to receive control data and configuration settings via said first connection point, and to transfer said control data and configuration settings to said control unit via said third connection point;

to send a request for one or more characteristics of said device via said third connection point, and to transmit said characteristics via said first connection point.

4. The extension element according to claim 1, wherein said processing unit is programmed according to a protocol, wherein said protocol defines the composition of a data frame, said data frame comprising a sequence of control data intended for successive devices in said network, and a break period preceding said sequence of control data.

5. The extension element according to claim 4, wherein said processing unit is configured to change said status from idle status to forward status upon start of said data frame, and to change said status from forward status to idle status upon end of said data frame, by changing the impedance in said read-write connection or in said write-read connection or in a connection between said first and second interface via said processing unit.

6. The extension element according to claim 5, wherein said processing unit comprises a data tracker that, when executed by the processing unit, actively follows said data frame while being transmitted via said read-write connection or said write-read connection, and detects said end of said data frame based on the data frame composition defined by said protocol.

7. The extension element according to claim 1, wherein said processing unit is configured to identify a neighbouring device by successively opening said switch, sending a request to said neighbouring device via said second connection point, and receiving a response comprising an identifier of said neighbouring device, or by, in the open state of said switch, successively bringing said extension element into the idle state, sending a request to said neighbouring device via said second connection point, and receiving a response comprising an identifier of said neighbouring device.

8. The extension element according to claim 1, wherein said processing unit is configured to detect a defect in said second or first communication cable by monitoring said second respectively first interface, and, on detecting an anomaly, opening said switch and sending an error message via said first second interface.

9. A device comprising:

an electrical and/or mechanical component;

a control unit connected to said electrical or mechanical component;

an extension element according to claim 1, wherein said third connection point of said extension element is connected to said control unit.

10. A system for controlling a network of devices, comprising:

one or more devices according to claim 9;

a central control element;

one or more communication cables, wherein each communication cable connects two of said devices to one another or connects one of said devices to said central control element, wherein said central control element is configured to transmit data to and to receive data from said network via said one or more communication cables.

11. The system according to claim 10, wherein each of said devices comprises an extension element wherein said processing unit is configured to identify a neighbouring device by successively opening said switch, sending a request to said neighbouring device via said second connection point, and receiving a response comprising an identifier of said neighbouring device, and wherein said central control element comprises a topology module configured to determine the order of said devices in said network by successively:

transmitting a command for said extension element of each of said devices to identify a neighbouring device;

requesting, from each of said devices, an identifier of the device and of an identified neighbouring device.

12. The system according to claim 10, wherein each of said devices comprises an extension element wherein said processing unit is configured to detect a defect in said second or first communication cable by monitoring said second respectively first interface, and, on detecting an anomaly, opening said switch and sending an error message via said first second interface, and said central control element and said devices are connected in a ring, and wherein said central control element comprises a self-healing module, configured to identify, on receiving of said error message from one of said devices, the communication cable with said defect and to adapt the data traffic accordingly.

13. A method for communication in a network of devices, mutually connected via a first and second communication cable, in which said network has a linear bus topology, said method comprising:

providing an extension element for each of said devices, comprising:

a first, second and third connection point, a switch connected to said first and second connection point, a processing unit connected to said third connection point, and to said first and second connection point over a connection which does not comprise said switch, a first and a second interface adapted for data exchange between said first respectively second connection point and said processing unit;

a read-write connection between the read port of said first interface and the write port of said second interface, and a write-read connection between the write port of said first interface and the read port of said second interface, connecting said first respectively second connection point to said first second communication cable;

connecting said third connection point to a control unit comprised in each of said devices;

controlling said network in bus mode by closing said switch by said processing unit to form a direct connection between said first and second connection point, which forms part of the common bus of said network;

controlling said network in serial mode by opening said switch by said processing unit to break said direct connection;

in said serial mode, changing the status of said extension element from an idle status, wherein no data traffic is possible over said read-write and write-read connection, to a forward status, wherein data traffic is possible over said read-write or write-read connection, by said processing unit changing the impedance in said read-write connection and/or in said write-read connection and/or in a connection between said first and second interface via said processing unit.

14. The method according to claim 13, said method further comprising:

providing an extension element wherein said processing unit is configured to change said status from idle status to forward status upon start of said data frame, and to change said status from forward status to idle status upon end of said data frame;

controlling said network in said serial mode;

upon detection of start of a data frame by said extension element of successive devices:

bringing said extension element in forward status;

transmitting said data frame via said read-write connection or write-read connection of successive devices;

upon detection of end of a data frame by said extension element of successive devices:

bringing said extension element in idle status.

15. The method according to claim 14, wherein said processing unit is programmed according to a protocol, wherein said protocol defines the composition of a data frame, said data frame comprising a sequence of control data intended for successive devices in said network, and a break period preceding said sequence of control data;

wherein in said break period of said data frame the time for successively bringing said extension element of successive devices in forward status is smaller than said break period.

* * * * *